United States Patent
Oda et al.

(10) Patent No.: US 9,601,248 B2
(45) Date of Patent: Mar. 21, 2017

(54) CALCINED FERRITE, SINTERED FERRITE MAGNET AND ITS PRODUCTION METHOD

(71) Applicant: HITACHI METALS, LTD., Tokyo (JP)

(72) Inventors: Etsushi Oda, Mishima-gun (JP); Hiroshi Iwasaki, Kumagaya (JP)

(73) Assignee: HITACHI METALS, LTD., Tokyo (JP)

( * ) Notice: Subject to any disclaimer, the term of this patent is extended or adjusted under 35 U.S.C. 154(b) by 214 days.

(21) Appl. No.: 14/423,891

(22) PCT Filed: Aug. 8, 2013

(86) PCT No.: PCT/JP2013/071463
§ 371 (c)(1),
(2) Date: Feb. 25, 2015

(87) PCT Pub. No.: WO2014/034401
PCT Pub. Date: Mar. 6, 2014

(65) Prior Publication Data
US 2015/0262741 A1    Sep. 17, 2015

(30) Foreign Application Priority Data
Aug. 31, 2012 (JP) .................................. 2012-191216

(51) Int. Cl.
*H01F 1/11* (2006.01)
*H01F 41/02* (2006.01)
(Continued)

(52) U.S. Cl.
CPC .......... *H01F 1/11* (2013.01); *C01G 49/0054* (2013.01); *C04B 35/26* (2013.01);
(Continued)

(58) Field of Classification Search
CPC ....... H01F 1/11; H01F 41/0266; C04B 25/26; C04B 25/645; C04B 25/6265; C01G 49/0054; C01P 2006/42
See application file for complete search history.

(56) References Cited

U.S. PATENT DOCUMENTS 6,139,766 A    10/2000 Taguchi et al.
6,402,980 B1    6/2002 Taguchi et al.
(Continued)

FOREIGN PATENT DOCUMENTS

CN    101552069 A    10/2009
EP    2043112 A1    4/2009
(Continued)

OTHER PUBLICATIONS

International Search Report of PCT/JP2013/071463 dated Nov. 19, 2013 [PCT/ISA/210].
(Continued)

*Primary Examiner* — Carol M Koslow
(74) *Attorney, Agent, or Firm* — Sughrue Mion, PLLC (57) ABSTRACT

A method comprising the steps of mixing raw material powders to a composition comprising metal elements of Ca, La, Sr, Ba, Fe and Co, whose atomic ratios are represented by the general formula of $Ca_{1-x-y}La_x(Sr_{y'}Ba_{1-y'})_yFe_{2n-z}Co_z$, wherein $1-x-y$, x and y are values in a region defined by a coordinate a: (0.470, 0.297, 0.233), a coordinate b: (0.300, 0.392, 0.308), a coordinate c: (0.300, 0.300, 0.400), a coordinate d: (0.400, 0.200, 0.400) and a coordinate e: (0.470, 0.200, 0.330) in a ternary diagram of x, y, and $1-x-y$, y' and z, and n representing a molar ratio meet $0.5 \leq y' \leq 1$, $0.2 \leq z < 0.25$, and $5.2 < n < 5.6$; calcining the raw material powder mixture; pulverizing the calcined body; molding the calcined powder; and sintering the resultant green body; 0.1% or more and less than 1.5% by mass of $SiO_2$ being added to the raw material powder mixture, the calcined body
(Continued)

or the calcined powder; and 0-2% by mass (as CaO) of $CaCO_3$ being added to the calcined body or the calcined powder.

4 Claims, 7 Drawing Sheets

(51) Int. Cl.
| | |
|---|---|
| C04B 35/26 | (2006.01) |
| C04B 35/32 | (2006.01) |
| C04B 35/40 | (2006.01) |
| C04B 35/626 | (2006.01) |
| C01G 49/00 | (2006.01) |
| C04B 35/645 | (2006.01) |

(52) U.S. Cl.
CPC ...... *C04B 35/6262* (2013.01); *C04B 35/6265* (2013.01); *C04B 35/62645* (2013.01); *C04B 35/645* (2013.01); *H01F 41/0266* (2013.01); *C01P 2006/42* (2013.01); *C04B 2235/3208* (2013.01); *C04B 2235/3213* (2013.01); *C04B 2235/3215* (2013.01); *C04B 2235/3217* (2013.01); *C04B 2235/3227* (2013.01); *C04B 2235/3241* (2013.01); *C04B 2235/3275* (2013.01); *C04B 2235/3277* (2013.01); *C04B 2235/3409* (2013.01); *C04B 2235/5445* (2013.01); *C04B 2235/767* (2013.01)

(56) References Cited

U.S. PATENT DOCUMENTS

| | | |
|---|---|---|
| 7,758,767 B2 | 7/2010 | Kobayashi et al. |
| 7,837,893 B2 | 11/2010 | Takami et al. |
| 7,906,036 B2 | 3/2011 | Takami et al. |
| 7,919,007 B2 | 4/2011 | Minachi et al. |
| 8,021,567 B2 | 9/2011 | Takami et al. |
| 8,206,606 B2 | 6/2012 | Hosokawa et al. |
| 8,506,838 B2 | 8/2013 | Hosokawa et al. |
| 8,591,760 B2 | 11/2013 | Yanagida et al. |
| 8,980,116 B2 | 3/2015 | Yanagida et al. |
| 9,202,613 B2 | 12/2015 | Yanagida et al. |
| 2006/0284136 A1 | 12/2006 | Takami et al. |
| 2007/0138432 A1 | 6/2007 | Minachi et al. |
| 2007/0194269 A1 | 8/2007 | Kobayashi et al. |
| 2009/0022992 A1 | 1/2009 | Takami et al. |
| 2009/0261288 A1 | 10/2009 | Hosokawa et al. |
| 2009/0314981 A1 | 12/2009 | Yanagida et al. |
| 2010/0237273 A1 | 9/2010 | Kobayashi et al. |
| 2011/0024672 A1 | 2/2011 | Takami et al. |
| 2012/0161910 A1 | 6/2012 | Nagaoka et al. |
| 2012/0280167 A1 | 11/2012 | Yanagida et al. |
| 2012/0326074 A1 | 12/2012 | Hosokawa et al. |
| 2014/0097378 A1 | 4/2014 | Yanagida et al. |

FOREIGN PATENT DOCUMENTS

| | | |
|---|---|---|
| EP | 2511249 A1 | 10/2012 |
| EP | 2538418 A1 | 12/2012 |
| JP | 10-149910 A | 6/1998 |
| JP | 11-154604 A | 6/1999 |
| JP | 3181559 B2 | 7/2001 |
| JP | 2006-104050 A | 4/2006 |
| JP | 2008-137879 A | 6/2008 |
| WO | 2005/027153 A1 | 3/2005 |
| WO | 2007/060757 A1 | 5/2007 |
| WO | 2007/077811 A1 | 7/2007 |
| WO | 2008/105449 A1 | 9/2008 |
| WO | 2011/004791 A1 | 1/2011 |
| WO | 2011/111756 A1 | 9/2011 |
| WO | 2011/115129 A1 | 9/2011 |

OTHER PUBLICATIONS

Communication dated Mar. 3, 2016 from the European Patent Office issued in corresponding Application No. 13834048.4.

CALCINED FERRITE, SINTERED FERRITE MAGNET AND ITS PRODUCTION METHOD

CROSS REFERENCE TO RELATED APPLICATIONS

This application is a National Stage of International Application No. PCT/JP2013/071463, filed Aug. 8, 2013 (claiming priority based on Japanese Patent Application No. 2012-191216, filed Aug. 31, 2012), the contents of which are incorporated herein by reference in their entirety.

FIELD OF THE INVENTION

The present invention relates to a calcined ferrite, and a sintered ferrite magnet and its production method.

BACKGROUND OF THE INVENTION

Sintered ferrite magnets are used in various applications such as motors, electric generators, speakers, etc. As typical sintered ferrite magnets, Sr ferrite ($SrFe_{12}O_{19}$) and Ba ferrite ($BaFe_{12}O_{19}$) having a hexagonal M-type magnetoplumbite structure are known. These sintered ferrite magnets are relatively inexpensively produced by a powder metallurgy method using iron oxide, carbonate of strontium (Sr) or barium (Ba), etc. as raw materials.

To provide electric parts of automobiles, parts of electric equipments, etc. with reduced size and weight and higher efficiency for environmental protection, etc., sintered ferrite magnets are recently required to have higher performance. Particularly demanded in motors used in electric parts of automobiles are sintered ferrite magnets having such high coercivity $H_{cJ}$ that they are not demagnetized by a strong demagnetizing field even when made thinner, while keeping high residual magnetic flux densities $B_r$.

To provide sintered ferrite magnets with improved magnetic properties, JP 10-149910 A and JP 11-154604 A propose methods for improving $H_{cJ}$ and $B_r$ by substituting part of Sr with rare earth elements such as La, etc. and part of Fe with Co in the above Sr ferrites.

Sr ferrites having part of Sr substituted by rare earth elements such as La, etc., and part of Fe substituted by Co, etc. (hereinafter referring to as "SrLaCo ferrite"), which are described in JP 10-149910 A and JP 11-154604 A, have excellent magnetic properties, so that they are widely used in various applications in place of conventional Sr ferrites and Ba ferrites. However, further improvement of magnetic properties is desired.

As sintered ferrite magnets, Ca ferrites are also known in addition to the above Sr ferrites and Ba ferrites. It is known that Ca ferrites have a stable structure expressed by the composition formula of $CaO$—$Fe_2O_3$ or $CaO$-$2Fe_2O_3$, and that La added provides the ferrites with a hexagonal crystal structure. However, they have magnetic properties on the same level as those of conventional Ba ferrites, not sufficiently high.

Japanese Patent 3181559 discloses a Ca ferrite having part of Ca substituted by rare earth elements such as La, etc., and part of Fe substituted by Co, etc. for improved $B_r$ and $H_{cJ}$, and improved temperature characteristics of $H_{cJ}$, by having an anisotropic magnetic field $H_A$ of 20 kOe or more (hereinafter referring to "CaLaCo ferrite"). It describes that this anisotropic magnetic field $H_A$ is 10% or more higher than that of Sr ferrites.

However, CaLaCo ferrites have $B_r$ and $H_{cJ}$ on the same level as those of SrLaCo ferrites and extremely poor $H_k/H_{cJ}$, despite a high anisotropic magnetic field $H_A$, failing to meet both requirements of high $H_{cJ}$ and high $H_k/H_{cJ}$, so that they have not been used yet in various applications such as motors, etc.

To improve the magnetic properties of CaLaCo ferrites, various proposals have been made. For example, JP 2006-104050 A proposes a CaLaCo ferrite having optimized atomic ratios of constituent elements and an optimized molar ratio n, with La and Co at a particular ratio. WO 2007/060757 A proposes a CaLaCo ferrite having part of Ca substituted by La and Ba. WO 2007/077811 A proposes a CaLaCo ferrite having part of Ca substituted by La and Sr.

WO 2008/105449 A proposes a method of reducing the particle sizes of crystal grains to increase a magnet density, and controlling the shapes of crystal grains to improve magnetic properties, in a composition containing more Sr and/or Ba than in WO 2007/060757 A and WO 2007/077811 A, by a pulverization process comprising a first fine pulverization step, a heat-treating step of powder obtained in the first fine pulverization step, and a second fine pulverization step of repulverizing the heat-treated powder (hereinafter referring to "heat-treating and repulverizing step").

However, the CaLaCo ferrites described in JP 2006-104050 A, WO 2007/060757 A, WO 2007/077811 A and WO 2008/105449 A need about 0.3 of Co by atomic ratio, despite improved magnetic properties than those of the CaLaCo ferrite proposed by Japanese Patent 3181559, so that more Co should be used than in sintered SrLaCo ferrite magnets commercially available presently (containing about 0.2 of Co by atomic ratio). Co is ten to several tens of times as expensive as iron oxide, a main component of ferrite magnets. Cost increase of raw materials is thus unavoidable, resulting in more expensive sintered ferrite magnets. Particularly, WO 2008/105449 A conducting a heat-treating and repulverizing step cannot avoid cost increase because of increase in production steps, suffering increase in both raw material cost and production cost. Accordingly, it fails to satisfy a market demand of cost.

Because the biggest advantage of sintered ferrite magnets is inexpensiveness, even sintered ferrite magnets having high magnetic properties would not be accepted in the market if they were expensive.

If the Co content were reduced to less than 0.3 by atomic ratio in CaLaCo ferrites, their magnetic properties would be on the same level as those of SrLaCo ferrites, losing the advantages of the CaLaCo ferrites having a high anisotropic magnetic field $H_A$.

OBJECT OF THE INVENTION

An object of the present invention is to provide an inexpensive sintered ferrite magnet having high $B_r$ and high $H_{cJ}$.

SUMMARY OF THE INVENTION

As a result of intensive research in view of the above object, the inventors have found that by limiting the amount of each element to a particular range with a molar ratio n much smaller than a stoichiometric value (n=6) in the composition of a calcined body of CaLaCo ferrite, it is possible to achieve high $B_r$ and high $H_{cJ}$, even if the Co content is made smaller than in conventional CaLaCo ferrites containing about 0.3 of Co by atomic ratio. The present invention has been completed based on such findings.

Thus, the calcined ferrite of the present invention comprises metal elements of Ca, La, Sr, Ba, Fe and Co, whose atomic ratios are represented by the general formula:

$Ca_{1-x-y}La_x(Sr_{y'}Ba_{1-y'})_yFe_{2n-z}Co_z,$ wherein 1−x−y, x and y are values in a region defined by a coordinate a: (0.470, 0.297, 0.233), a coordinate b: (0.300, 0.392, 0.308), a coordinate c: (0.300, 0.300, 0.400), a coordinate d: (0.400, 0.200, 0.400) and a coordinate e: (0.470, 0.200, 0.330) in a ternary diagram of x, y, and 1−x−y (see FIG. 1); and y' and z, and n representing a molar ratio are values meeting 0.5≤y'≤1,
0.2≤z<0.25, and
5.2<n<5.6.

A method for producing a sintered ferrite magnet according to the present invention comprising the steps of mixing raw material powders to a composition comprising metal elements of Ca, La, Sr, Ba, Fe and Co, whose atomic ratios are represented by the general formula:

$Ca_{1-x-y}La_x(Sr_{y'}Ba_{1-y'})_yFe_{2n-z}Co_z,$ wherein 1−x−y, x and y are values in a region defined by a coordinate a: (0.470, 0.297, 0.233), a coordinate b: (0.300, 0.392, 0.308), a coordinate c: (0.300, 0.300, 0.400), a coordinate d: (0.400, 0.200, 0.400) and a coordinate e: (0.470, 0.200, 0.330) in a ternary diagram of x, y, and 1−x−y (see FIG. 1); and y' and z, and n representing a molar ratio are values meeting 0.5≤y'≤1,
0.2≤z<0.25, and
5.2<n<5.6, thereby obtaining a raw material powder mixture;

calcining the raw material powder mixture to obtain a calcined body;

pulverizing the calcined body to obtain a calcined powder;

molding the calcined powder to obtain a green body; and sintering the green body to obtain a sintered body;

0.1% or more and less than 1.5% by mass of $SiO_2$ being added to 100% by mass of the raw material powder mixture, the calcined body or the calcined powder; and 0-2% by mass (as CaO) of $CaCO_3$ being added to 100% by mass of the calcined body or the calcined powder.

Another method of the present invention for producing a sintered ferrite magnet comprises the steps of mixing raw material powders to a composition comprising metal elements of Ca, La, Sr, Ba, Fe and Co, whose atomic ratios are represented by the general formula:

$Ca_{1-x-y}La_x(Sr_{y'}Ba_{1-y'})_yFe_{2n-z}Co_z,$ wherein 1−x−y, x and y are values in a region defined by a coordinate a: (0.470, 0.297, 0.233), a coordinate b: (0.300, 0.392, 0.308), a coordinate c: (0.300, 0.300, 0.400), a coordinate d: (0.400, 0.200, 0.400) and a coordinate e: (0.470, 0.200, 0.330) in a ternary diagram of x, y, and 1−x−y (see FIG. 1); and y' and z, and n representing a molar ratio are values meeting 0.5≤y'≤1,
0≤z<0.25, and
5.2<n<5.6, thereby obtaining a raw material powder mixture;

calcining the raw material powder mixture to obtain a calcined body;

pulverizing the calcined body to obtain a calcined powder;

molding the calcined powder to obtain a green body; and sintering the green body to obtain a sintered body;

a raw material powder of Co being added to the calcined body or the calcined powder, such that the above z meets 0.2≤z<0.25 as a whole;

0.1% or more and less than 1.5% by mass of $SiO_2$ being added to 100% by mass of the raw material powder mixture, the calcined body or the calcined powder; and 0-2% by mass (as CaO) of $CaCO_3$ being added to 100% by mass of the calcined body or the calcined powder.

The sintered ferrite magnet of the present invention produced by the above method comprises metal elements of Ca, La, Sr, Ba, Fe and Co, whose atomic ratios are represented by the general formula:

$Ca_{1-x-y}La_x(Sr_{y'}Ba_{1-y'})_yFe_{2n-z}Co_z,$ wherein 1−x−y, x and y are values in a region defined by a coordinate a: (0.470, 0.297, 0.233), a coordinate b: (0.300, 0.392, 0.308), a coordinate f: (0.221, 0.289, 0.490), a coordinate g: (0.221, 0.221, 0.558), a coordinate h: (0.295, 0.147, 0.558), a coordinate i: (0.346, 0.147, 0.507) and a coordinate e: (0.470, 0.200, 0.330) in a ternary diagram of x, y, and 1−x−y (see FIG. 2); and y' and z, and n representing a molar ratio are values meeting 0.5≤y'≤1,
0.147≤z<0.25, and
3.88≤n<5.6;

the sintered ferrite magnet having a residual magnetic flux density $B_r$ (mT) and an intrinsic coercivity $H_{cJ}$ (kA/m) at 23° C. meeting the relation of $B_r+H_{cJ}/4≥535.5$.

DESCRIPTION OF THE PREFERRED EMBODIMENTS

[1] Calcined Ferrite

The calcined ferrite of the present invention comprises metal elements of Ca, La, Sr, Ba, Fe and Co, whose atomic ratios are represented by the general formula:

$$Ca_{1-x-y}La_x(Sr_{y'}Ba_{1-y'})_yFe_{2n-z}Co_z,$$

wherein $1-x-y$, x and y are values in a region I defined by a coordinate a: (0.470, 0.297, 0.233), a coordinate b: (0.300, 0.392, 0.308), a coordinate c: (0.300, 0.300, 0.400), a coordinate d: (0.400, 0.200, 0.400) and a coordinate e: (0.470, 0.200, 0.330) in a ternary diagram of x, y, and $1-x-y$ (see FIG. 1); and y' and z, and n representing a molar ratio are values meeting $0.5 \le y' \le 1$,
$0.2 \le z < 0.25$, and
$5.2 < n < 5.6$.

Using the calcined ferrite of the present invention, it is possible to produce a sintered ferrite magnet having high $B_r$ and high $H_{cJ}$ at a low cost.

The calcined ferrite of the present invention comprises as a main phase a ferrite phase having a hexagonal M-type magnetoplumbite structure. In general, a compound determining the properties (physical properties, magnetic properties, etc.) of a magnetic material is defined as "main phase." A main phase in the calcined ferrite of the present invention, namely, a ferrite phase having a hexagonal M-type magnetoplumbite structure, determines the basic character such as properties of the calcined ferrite of the present invention.

"Having a hexagonal M-type magnetoplumbite structure" means that a hexagonal M-type magnetoplumbite structure is mainly observed in an X-ray diffraction pattern of the calcined ferrite measured under a general condition.

Figure 1:
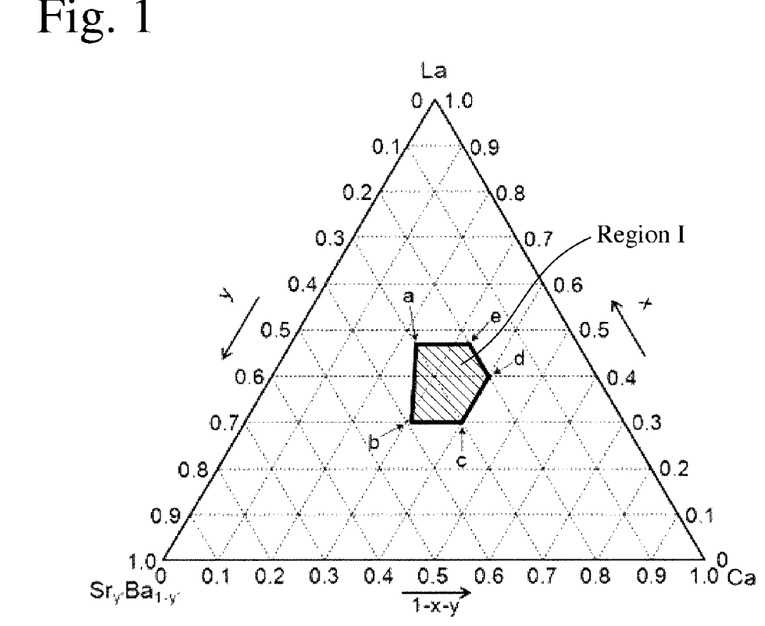
FIG. 1 is a ternary diagram showing the composition range of the calcined body of the present invention.

A ternary diagram of FIG. 1 indicates a Ca content $(1-x-y)$, a La content (x) and a (Sr+Ba) content (y), $x+y+(1-x-y)$ being 1, plotted in an equilateral triangle, with a base side as an axis for the Ca content $(1-x-y)$, a right side as the La content (x), and a left side as the (Sr+Ba) content (y). An arbitrary point ($\alpha$, $\beta$, $\gamma$) in the ternary diagram indicates a distance $\alpha$ from the base side, a distance $\beta$ from the right oblique side, and a distance $\gamma$ from the left oblique side.

Reasons for limiting the ratios of the elements will be explained below.

$1-x-y$ representing the Ca content is in a range of $0.23 \le 1-x-y \le 0.4$, when $1-x-y$, x and y are in the above region I. When $1-x-y$ is less than 0.23 or more than 0.4, foreign phases such as an orthoferrite phase, a perovskite phase, etc. are easily formed, undesirably resulting in low magnetic properties.

x representing the La content is in a range of $0.3 \le x \le 0.47$, when $1-x-y$, x and y are in the above region I. When x is less than 0.3, foreign phases such as a spinel ferrite phase, etc. are easily formed, undesirably resulting in low magnetic properties. When x exceeds 0.47, foreign phases such as an orthoferrite phase, a hematite phase, etc. are easily formed, undesirably resulting in low magnetic properties.

y representing the total amount of Sr and Ba contained is in a range of $0.2 \le y \le 0.4$, when $1-x-y$, x and y are in the above region I. When y is less than 0.2 or more than 0.4, foreign phases such as an orthoferrite phase, $SrFeO_3$, $BaFe_2O_4$, etc. are easily formed, undesirably resulting in low magnetic properties.

y' representing a ratio of Sr to (Sr+Ba) is in a range of $0.5 \le y' \le 1$. Less than 0.5 of y' undesirably reduces magnetic properties, particularly $H_{cJ}$.

z representing the Co content is in a range of $0.2 \le z < 0.25$. Because Co is expensive, its amount is preferably as small as possible to suppress a raw material cost, but less than 0.2 of z undesirably reduces magnetic properties, particularly $H_{cJ}$. When z is 0.25 or more, foreign phases such as a spinel ferrite phase, etc. are easily formed, undesirably resulting in drastically reduced magnetic properties, particularly rectangularity of a demagnetization curve.

n represents a molar ratio of (Fe+Co) to (Ca+La+Sr+Ba), expressed as $2n=(Fe+Co)/(Ca+La+A)$. The molar ratio n is $5.2<n<5.6$. 5.2 or less or 5.6 or more of n undesirably reduces magnetic properties.

Though the above composition indicates the atomic ratios of metal elements, a composition including oxygen (O) is represented by the general formula:

$$Ca_{1-x-y}La_x(Sr_{y'}Ba_{1-y'})_yFe_{2n-z}Co_zO_\alpha,$$

wherein $1-x-y$, x and y are values in a region I defined by a coordinate a: (0.470, 0.297, 0.233), a coordinate b: (0.300, 0.392, 0.308), a coordinate c: (0.300, 0.300, 0.400), a coordinate d: (0.400, 0.200, 0.400) and a coordinate e: (0.470, 0.200, 0.330) in a ternary diagram of x, y, and $1-x-y$ (see FIG. 1); and y' and z, and n representing a molar ratio are values meeting $0.5 \le y' \le 1$,
$0.2 \le z < 0.25$, and
$5.2 < n < 5.6$;

and $\alpha=19$ in a stoichiometric composition in which La and Fe are trivalent, and Co is divalent, with $x=z$, and $n=6$.

In the oxygen-including composition of the calcined ferrite, the molar number of oxygen differs depending on the valences of Fe and Co, the value of n, etc. Also, a ratio of oxygen to the metal elements varies depending on the valence of oxygen, the valences of Fe and Co in the ferrite phase, etc. Accordingly, an actual molar number $\alpha$ of oxygen may be deviated from 19. In the present invention, the composition is expressed by the atomic ratios of metal elements, which most easily define the composition.

[2] Production method of sintered ferrite magnet

The Production Method of the Sintered Ferrite Magnet of the Present invention comprises the steps of mixing raw material powders to a composition comprising metal elements of Ca, La, Sr, Ba, Fe and Co, whose atomic ratios are represented by the general formula:

$$Ca_{1-x-y}La_x(Sr_{y'}Ba_{1-y'})_yFe_{2n-z}Co_z,$$

wherein $1-x-y$, x and y are values in a region I defined by a coordinate a: (0.470, 0.297, 0.233), a coordinate b: (0.300, 0.392, 0.308), a coordinate c: (0.300, 0.300, 0.400), a coordinate d: (0.400, 0.200, 0.400) and a coordinate e: (0.470, 0.200, 0.330) in a ternary diagram of x, y, and $1-x-y$ (see FIG. 1); and y' and z, and n representing a molar ratio are values meeting $0.5 \le y' \le 1$,
$0.2 \le z < 0.25$, and
$5.2 < n < 5.6$, thereby obtaining a raw material powder mixture;
calcining the raw material powder mixture to obtain a calcined body;
pulverizing the calcined body to obtain a calcined powder;

molding the calcined powder to obtain a green body; and sintering the green body to obtain a sintered body;

0.1% or more and less than 1.5% by mass of $SiO_2$ being added to 100% by mass of the raw material powder mixture, the calcined body or the calcined powder; and 0-2% by mass (as CaO) of $CaCO_3$ being added to 100% by mass of the calcined body or the calcined powder.

In this method, all raw material powders (excluding $SiO_2$ and $CaCO_3$ as sintering aids) are added before calcining. This method is thus called "prior-addition method."

Another method of the present invention for producing a sintered ferrite magnet comprises the steps of mixing raw material powders to a composition comprising metal elements of Ca, La, Sr, Ba, Fe and Co, whose atomic ratios are represented by the general formula:

$$Ca_{1-x-y}La_x(Sr_{y'}Ba_{1-y'})Fe_{2n-z}Co_z,$$

wherein 1−x−y, x and y are values in a region I defined by a coordinate a: (0.470, 0.297, 0.233), a coordinate b: (0.300, 0.392, 0.308), a coordinate c: (0.300, 0.300, 0.400), a coordinate d: (0.400, 0.200, 0.400) and a coordinate e: (0.470, 0.200, 0.330) in a ternary diagram of x, y, and 1−x−y (see FIG. 1); and y' and z, and n representing a molar ratio are values meeting 0.5≤y'≤1, 0≤z<0.25, and 5.2<n<5.6, thereby obtaining a raw material powder mixture;

calcining the raw material powder mixture to obtain a calcined body;

pulverizing the calcined body to obtain a calcined powder;

molding the calcined powder to obtain a green body; and sintering the green body to obtain a sintered body;

a raw material powder of Co being added to the calcined body or the calcined powder, such that the above z meets 0.2≤z<0.25 as a whole;

0.1% or more and less than 1.5% by mass of $SiO_2$ being added to 100% by mass of the raw material powder mixture, the calcined body or the calcined powder; and 0-2% by mass (as CaO) of $CaCO_3$ being added to 100% by mass of the calcined body or the calcined powder.

In this method, (a) all raw material powders (excluding a raw material powder of Co, and $SiO_2$ and $CaCO_3$ as sintering aids) are entirely added before calcining; or (b) part of a raw material powder of Co and total amounts of all other raw material powders than Co (excluding $SiO_2$ and $CaCO_3$ as sintering aids) are added before calcining, and all or remaining part of the raw material of Co is added to the calcined body or calcined powder after calcining and before molding, such that the value of z meets 0.2≤z<0.25 as a whole (hereinafter referring to as "post-addition method").

In the present invention, any of the prior-addition method and the post-addition method can produce a sintered ferrite magnet described below. Each step will be explained below.

(a) Mixing Step of Raw Material Powders

Prepared are metal-containing raw material powders having a composition comprising metal elements of Ca, La, Sr, Ba, Fe and Co, whose atomic ratios are represented by the general formula:

$$Ca_{1-x-y}La_x(Sr_{y'}Ba_{1-y'})Fe_{2n-z}Co_z,$$

wherein 1−x−y, x and y are values in the region I in a ternary diagram of x, y, and 1−x−y (see FIG. 1); and y' and z, and n representing a molar ratio are values meeting 0.5≤y'≤1, 0.2≤z<0.25, and 5.2<n<5.6.

Each raw material powder may be oxide, carbonate, hydroxide, nitrate, chloride, etc. of each metal, irrespective of its valence. Solutions of raw material powders may be used. Ca compounds may be carbonate, oxide, chloride, etc. of Ca. La compounds may be oxides such as $La_2O_3$, hydroxides such as $La(OH)_3$; carbonates such as $La_2(CO_3)_3 \cdot 8H_2O$, etc. Compounds of the element A may be carbonates, oxides, chlorides, etc. of Ba and/or Sr. Iron compounds may be iron oxide, iron hydroxide, iron chloride, mill scale, etc. Co compounds may be oxides such as CoO, $Co_3O_4$, etc.; hydroxide such as CoOOH, $Co(OH)_2$, $Co_3O_4 \cdot m_1H_2O$ ($m_1$ is a positive number), etc.; carbonate such as $CoCO_3$, etc.; and basic carbonates such as $m_2CoCO_3 \cdot m_3Co(OH)_2 \cdot m_4H_2O$, etc. ($m_2$, $m_3$ and $m_4$ are positive numbers).

As described above, an entire amount of a raw material powder of Co (for example, $Co_3O_4$ powder) may be added in the mixing step of raw material powders (before calcining) (prior-addition method), or part or all of a raw material powder of Co may be added after calcining and before molding (post-addition method).

During calcining, up to about 1% by mass of a B-containing compound such as $B_2O_3$, $H_3BO_3$, etc. may be added, if necessary, to accelerate a reaction. Particularly, the addition of $H_3BO_3$ is effective to improve $H_{cJ}$ and $B_r$. The amount of $H_3BO_3$ added is preferably 0.3% by mass or less, most preferably about 0.2% by mass. Less than 0.1% by mass of $H_3BO_3$ has a small effect of improving $B_r$, and more than 0.3% by mass of $H_3BO_3$ reduces $B_r$. Also, because $H_3BO_3$ has an effect of controlling the shape and size of crystal grains during sintering, it may be added after calcining (before fine pulverization and before sintering), or both before and after calcining.

The prepared raw material powders are mixed to provide a raw material powder mixture. The raw material powders may be mixed in a wet or dry manner. Stirring with media such as steel balls enables more uniform mixing of raw material powders. In wet mixing, water is preferably used as a solvent. To increase the dispersibility of raw material powders, known dispersants such as ammonium polycarboxylate, calcium gluconate, etc. may be used. The mixed raw material slurry may be calcined as it is or after dewatering.

(b) Calcining Step

The raw material powder mixture obtained by dry or wet mixing is heated in an electric furnace, a gas furnace, etc., to form a ferrite compound having a hexagonal M-type magnetoplumbite structure by a solid-phase reaction. This process is called "calcining," and the resultant compound is called "calcined body."

The calcining step is conducted preferably in an atmosphere having an oxygen concentration of 5% or more. At an oxygen concentration of less than 5%, abnormal grain growth, the formation of foreign phases, etc. occur. The more preferred oxygen concentration is 20% or more.

In the calcining step, a solid-phase reaction forming a ferrite phase proceeds more as the temperature is elevated. At a calcining temperature of lower than 1100° C., unreacted hematite (iron oxide) remains, resulting in low magnetic properties. At a calcining temperature exceeding 1450° C., crystal grains excessively grow, needing too much time for pulverization. Accordingly, the calcining temperature is preferably 1100-1450° C., more preferably 1200-1350° C. The calcining time is preferably 0.5-5 hours.

When $H_3BO_3$ is added before calcining, a ferritization reaction is accelerated, so that calcining can be conducted at 1100-1300° C.

(c) Addition of Sintering Aid $SiO_2$ and $CaCO_3$ are added as sintering aids. 0.1% or more and less than 1.5% by mass of $SiO_2$ is added to 100% by mass of the raw material powder mixture, the calcined body or the calcined powder, after mixing the raw material powders and before molding. Namely, 0.1% or more and less than 1.5% by mass of $SiO_2$ is added to 100% by mass of the raw material powder mixture (addition pattern 1), to 100% by mass of the calcined body (addition pattern 2), or to 100% by mass of the calcined powder (addition pattern 3), or in combination of these three patterns. When addition is conducted with the above patterns combined, $SiO_2$ is added such that the total amount of $SiO_2$ added in these patterns is 0.1% or more and less than 1.5% by mass.

0-2% by mass (as CaO) of $CaCO_3$ is added to 100% by mass of the calcined body or powder after calcining and before molding. Namely, 0-2% by mass of $CaCO_3$ is added to 100% by mass of the calcined body (addition pattern 4), or to 100% by mass of the calcined powder (addition pattern 5), or in both addition patterns 4 and 5. When $CaCO_3$ is added in both patterns 4 and 5, the total amount of $CaCO_3$ added in the patterns 4 and 5 should be 0-2% by mass.

In the addition pattern 1 in which $SiO_2$ is added to the raw material powder mixture, the timing of addition may be before, during or after the preparation of the raw material powder mixture. When $SiO_2$ is added after the preparation, a raw material powder mixture is then further added. When $SiO_2$ or $CaCO_3$ is added to the calcined body (patterns 2 or 4) or to the calcined powder (patterns 3 or 5), a pulverization step may be conducted after adding sintering aids to the calcined body obtained by the calcining step; sintering aids may be added during the pulverization step; or the calcined powder after pulverized may be mixed with sintering aids and then molded.

The addition of 1.5% or more by mass of $SiO_2$ lowers $H_{cJ}$, undesirably resulting in low $B_r$ and $H_k/H_{cJ}$. Though $SiO_2$ is most preferably added to the calcined body, part of $SiO_2$ may be added before calcining (in the mixing step of raw material powders) as described above. With $SiO_2$ added before calcining, the size of crystal grains can be controlled during calcining.

0-2% by mass (as CaO) of $CaCO_3$ is added to 100% by mass of the calcined body. The addition of $CaCO_3$ improves $B_r$ and $H_{cJ}$. More than 2% by mass of $CaCO_3$ added undesirably lowers $B_r$ and $H_k/H_{cJ}$. In the present invention, the amount of $CaCO_3$ added is expressed by an amount as CaO. The amount of $CaCO_3$ added can be determined from the amount as CaO by the equation of (molecular weight of $CaCO_3$×amount as CaO)/molecular weight of CaO. For example, when 1.5% by mass (as CaO) of $CaCO_3$ is added, the amount of $CaCO_3$ added is [40.08 (atomic weight of Ca)+12.01 (atomic weight of C)+48.00 (atomic weight of O×3)=100.09 (molecular weight of $CaCO_3$)]×1.5% by mass (amount as CaO)/[40.08 (atomic weight of Ca)+16.00 (atomic weight of O)=56.08 (molecular weight of CaO)] =2.677% by mass.

Because the CaLaCo ferrite of the present invention contains Ca as a main phase component, the addition of $SiO_2$ as a sintering aid makes it possible to form a liquid phase without adding $CaCO_3$, enabling sintering. Though the present invention can be performed without adding $CaCO_3$, $CaCO_3$ is preferably added to prevent decrease in $H_{cJ}$.

In addition to $SiO_2$ and $CaCO_3$ described above, $Cr_2O_3$, $Al_2O_3$, etc. can be added to improve magnetic properties, after calcining, or before molding as described below. Each is preferably 5% by mass or less.

(d) Pulverization Step

The calcined body is pulverized by a vibration mill, a ball mill, an attritor, etc. to provide a calcined powder. The calcined powder preferably has an average particle size of about 0.4-0.8 μm (measured by an air permeation method). In the pulverization step, either dry pulverization or wet pulverization may be conducted, though both are preferably combined.

Wet pulverization is conducted using water and/or a non-aqueous solvent (an organic solvent such as acetone, ethanol, xylene, etc.) as a dispersion medium. The wet pulverization prepares a slurry of the calcined powder in a dispersion medium. 0.2-2% by mass, as a solid component ratio, of known dispersant and/or surfactant are preferably added to the slurry. After the wet pulverization, the slurry is preferably concentrated and blended.

In WO 2008/105449 A, a heat-treating and repulverizing step comprising a first fine pulverization step, a step of heat-treating powder obtained by the first fine pulverization step, and a second fine pulverization step of repulverizing the heat-treated powder is conducted as the pulverization step, thereby making the particle sizes of crystal grains smaller to increase the density of a magnet, and further controlling the shapes of crystal grains to improve magnetic properties. However, the present invention provides a sintered ferrite magnet having high $B_r$ and $H_{cJ}$ without the heat-treating and repulverizing step, by carrying out the above method on the calcined ferrite having the above composition.

(e) Molding Step

The slurry after the pulverization step is press-molded in a magnetic field or without a magnetic field, while removing a dispersion medium. Press-molding in a magnetic field can align the crystal orientations of powder particles, thereby drastically improving magnetic properties. Further, a dispersant and a lubricant may be added in an amount of 0.01-1% by mass each to improve orientation. Before molding, the slurry may be concentrated, if necessary. The concentration is preferably conducted by centrifugal separation, filter pressing, etc.

(f) Sintering step

The green body obtained by press-molding is degreased, if necessary, and then sintered. The sintering is conducted in an electric furnace, a gas furnace, etc. The sintering is preferably conducted in an atmosphere having an oxygen concentration of 10% or more. Less than 10% of the oxygen concentration causes abnormal grain growth, the formation of foreign phases, etc., thereby deteriorating magnetic properties. The oxygen concentration is more preferably 20% or more, most preferably 100%. The sintering temperature is preferably 1150-1250° C. The sintering time is preferably 0.5-2 hours. A sintered magnet obtained by the sintering step has an average crystal grain size of about 0.5-2 μm.

The sintered ferrite magnet is subjected to known production steps such as machining, cleaning, inspection, etc.

[3] Sintered Ferrite Magnet

Figure 2:
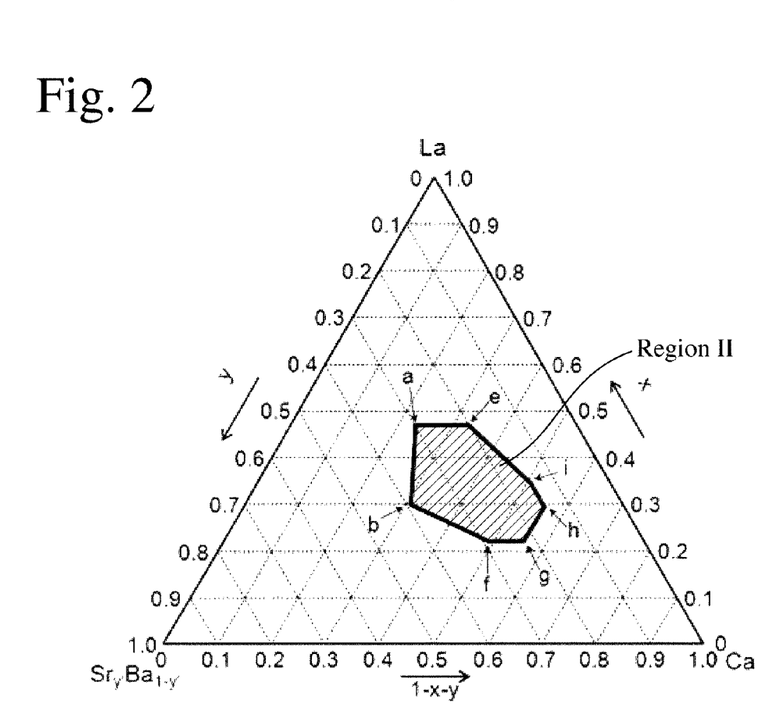
FIG. 2 is a ternary diagram showing the composition range of the sintered ferrite magnet of the present invention.

The sintered ferrite magnet of the present invention produced by the above method comprises metal elements of Ca, La, Sr, Ba, Fe and Co, whose atomic ratios are represented by the general formula:

$Ca_{1-x-y}La_x(Sr_{y'}Ba_{1-y'})Fe_{2n-z}Co_z$, wherein 1−x−y, x and y are values in a region II defined by a coordinate a: (0.470, 0.297, 0.233), a coordinate b: (0.300, 0.392, 0.308), a coordinate f: (0.221, 0.289, 0.490), a coordinate g: (0.221, 0.221, 0.558), a coordinate h: (0.295, 0.147, 0.558), a coordinate i: (0.346, 0.147, 0.507) and a coordinate e: (0.470, 0.200, 0.330) in a ternary diagram of x, y, and 1−x−y (see FIG. 2); and y' and z, and n representing a molar ratio are values meeting 0.5≤y'≤1, 0.147≤z<0.25, and 3.88<n<5.6;

the sintered ferrite magnet having a residual magnetic flux density $B_r$ (mT) and an intrinsic coercivity $H_{cJ}$ (kA/m) at 23° C. meeting the relation of $B_r + H_{cJ}/4 \geq 535.5$. The ternary diagram shown in FIG. 2 is the same as shown in FIG. 1, except for a region indicating the composition range.

The sintered ferrite magnet of the present invention comprises as a main phase a ferrite phase having a hexagonal M-type magnetoplumbite structure. In general, a magnetic material, particularly a sintered magnet is composed of pluralities of compounds, and a compound determining its properties (physical properties, magnetic properties, etc.) is defined as "a main phase." A main phase in the present invention, namely, a ferrite phase having a hexagonal M-type magnetoplumbite structure, determines the basic properties such as physical properties, magnetic properties, etc. of the sintered ferrite magnet of the present invention.

"Having a hexagonal M-type magnetoplumbite structure" means that a hexagonal M-type magnetoplumbite structure is mainly observed in an X-ray diffraction pattern of the sintered ferrite magnet measured under a general condition.

The sintered ferrite magnet of the present invention comprises a grain boundary phase containing Si. In the present invention, 0.1% or more and less than 1.5% by mass of $SiO_2$ and 0-2% by mass (as CaO) of $CaCO_3$ are added to 100% by mass of the calcined body in the production process as described above. $SiO_2$ and $CaCO_3$ mainly constitute the grain boundary phase. Accordingly, the grain boundary phase contains Si. Because it is difficult to observe the grain boundary phase by an X-ray diffraction pattern, it is preferably observed by a transmission electron microscope, etc.

In the present invention, the grain boundary phase observed in an arbitrary cross section of the sintered ferrite magnet includes a linear grain boundary phase existing between main phases, which may be called "two-grain boundary phase" by those skilled in the art; and a grain boundary phase having a substantially polygonal (triangular) or irregular shape existing among three or more main phases, which may be called "triplet-junction grain boundary phase" by those skilled in the art.

The sintered ferrite magnet of the present invention may contain a third phase containing a higher atomic ratio of La than in the main phase, in addition to the main phase and the grain boundary phase. The term "third phase" means a phase different from the main phase (first phase) and the grain boundary phase (second phase), but does not define its ratio, the order of precipitation, etc. The third phase is not indispensable in the present invention, meaning that the presence or absence of the third phase does not change the construction and effects of the present invention. The sintered ferrite magnet of the present invention may contain foreign phases (spinel phase, etc.) and impurity phases observed in trace amounts (about 5% or less by mass) by X-ray diffraction, etc. The quantitative determination of foreign phases by X-ray diffraction can be conducted by such a method as Rietveld analysis.

The sintered ferrite magnet of the present invention has a high residual magnetic flux density $B_r$ (mT) and an high intrinsic coercivity $H_{cJ}$ (kA/m) at 23° C., which meet the relation of $B_r + H_{cJ}/4 \geq 535.5$. Accordingly, the sintered ferrite magnet can be made fully thin for motors recently used in electric parts for automobiles.

The present invention will be explained in further detail by Examples below, without intention of restricting the present invention thereto.

Example 1

$CaCO_3$ powder, $La(OH)_3$ powder, $SrCO_3$ powder, $BaCO_3$ powder, $Fe_2O_3$ powder and $Co_3O_4$ powder were mixed to compositions represented by the metal element composition formula (by atomic ratio) of $Ca_{1-x-y}La_x(Sr_{y'}Ba_{1-y'})_yFe_{2n-z}Co_z$ as shown in Table 1, and 0.1% by mass of $H_3BO_3$ powder was added to 100% by mass of each resultant mixture to prepare each raw material powder mixture. Each raw material powder mixture was wet-ball-milled for 4 hours, dried, granulated, and then calcined at 1250° C. for 3 hours in the air. Each resultant calcined body was coarsely pulverized to coarse powder by a hammer mill. Table 1 shows the compositions of calcined bodies.

100% by mass of each coarse powder was mixed with 0.7% by mass (as CaO) of $CaCO_3$ powder, and 0.6% by mass of $SiO_2$ powder, wet-ball-milled with water as a dispersion medium, and then finely pulverized to an average particle size of 0.6 μm (measured by an air permeation method). Each resultant finely pulverized powder slurry was molded under pressure of about 50 MPa in a magnetic field of about 1.3 T in parallel with a compression direction, while removing the dispersion medium. Each resultant green body was sintered at about 1200° C. for 1 hour in the air to obtain each sintered magnet.

The measurement results of $B_r$ and $H_{cJ}$ of the sintered magnets are shown in Table 1 and FIGS. 3-6. In Table 1, Samples with * are Comparative Examples. Samples 11-18 are Comparative Examples, which are based on the composition of Sample 13 described in Example of WO 2008/105449 A. The composition of Sample 13 used as Comparative Example is a typical composition of WO 2008/105449 A, because it is a base for many samples (Samples 29-40, 51-58, 64-79, 82, 85-92, 93-94, 101-102, 103-104, 131-136, 137-139, and 146-157) in Examples.

TABLE 1

| Sample | 1−x−y | x | y | y' | yy' | y(1−y') | z | n |
|---|---|---|---|---|---|---|---|---|
| 1* | 0.275 | 0.385 | 0.340 | 1.000 | 0.340 | 0 | 0.24 | 5.2 |
| 2 | 0.275 | 0.385 | 0.340 | 1.000 | 0.340 | 0 | 0.24 | 5.3 |
| 3 | 0.275 | 0.385 | 0.340 | 1.000 | 0.340 | 0 | 0.24 | 5.4 |
| 4 | 0.275 | 0.385 | 0.340 | 1.000 | 0.340 | 0 | 0.24 | 5.5 |
| 5* | 0.275 | 0.385 | 0.340 | 1.000 | 0.340 | 0 | 0.24 | 5.6 |
| 6* | 0.275 | 0.385 | 0.340 | 1.000 | 0.340 | 0 | 0.24 | 5.8 |
| 7* | 0.375 | 0.385 | 0.240 | 1.000 | 0.240 | 0 | 0.24 | 5.2 |
| 8 | 0.375 | 0.385 | 0.240 | 1.000 | 0.240 | 0 | 0.24 | 5.3 |
| 9 | 0.375 | 0.385 | 0.240 | 1.000 | 0.240 | 0 | 0.24 | 5.4 |
| 10 | 0.375 | 0.385 | 0.240 | 1.000 | 0.240 | 0 | 0.24 | 5.5 |
| 11* | 0.200 | 0.390 | 0.410 | 1.000 | 0.410 | 0 | 0.3 | 5.0 |
| 12* | 0.200 | 0.390 | 0.410 | 1.000 | 0.410 | 0 | 0.3 | 5.2 |
| 13* | 0.200 | 0.390 | 0.410 | 1.000 | 0.410 | 0 | 0.3 | 5.4 |
| 14* | 0.200 | 0.390 | 0.410 | 1.000 | 0.410 | 0 | 0.3 | 5.6 |
| 15* | 0.200 | 0.390 | 0.410 | 1.000 | 0.410 | 0 | 0.3 | 5.8 |
| 16* | 0.200 | 0.390 | 0.410 | 1.000 | 0.410 | 0 | 0.3 | 5.9 |
| 17* | 0.200 | 0.390 | 0.410 | 1.000 | 0.410 | 0 | 0.3 | 6.0 |
| 18* | 0.200 | 0.390 | 0.410 | 1.000 | 0.410 | 0 | 0.3 | 6.2 |

| Sample | $B_r$ (mT) | $H_{cJ}$ (kA/m) | $B_r + H_{cJ}/4$ |
|---|---|---|---|
| 1* | 456.2 | 236.0 | 515.2 |
| 2 | 454.6 | 334.4 | 538.2 |

TABLE 1-continued

| | | | |
|---|---|---|---|
| 3 | 453.5 | 393.3 | 551.8 |
| 4 | 452.7 | 407.5 | 554.6 |
| 5* | 447.0 | 352.0 | 535.0 |
| 6* | 430.1 | 363.9 | 521.1 |
| 7* | 454.0 | 239.0 | 513.8 |
| 8 | 453.6 | 330.1 | 536.1 |
| 9 | 454.7 | 366.9 | 546.4 |
| 10 | 444.9 | 364.4 | 536.0 |
| 11* | 448.8 | 217.4 | 503.1 |
| 12* | 454.6 | 222.6 | 510.2 |
| 13* | 456.1 | 259.3 | 520.9 |
| 14* | 454.8 | 348.4 | 541.9 |
| 15* | 453.4 | 360.8 | 543.6 |
| 16* | 451.2 | 301.4 | 526.6 |
| 17* | 442.5 | 319.5 | 522.4 |
| 18* | 428.8 | 310.3 | 506.4 |

Note:
*indicates Comparative Example.

Figure 3:
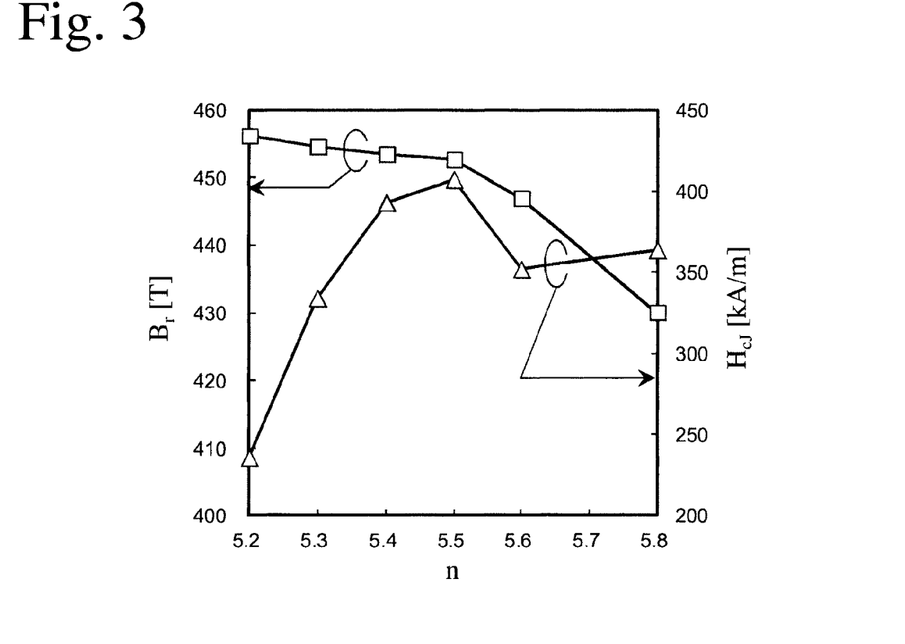
FIG. 3 is a graph showing the relation between a molar ratio n and $B_r$ and $H_{cJ}$ in calcined bodies for the sintered ferrite magnets of Samples 1-6 in Example 1.
Figure 4:
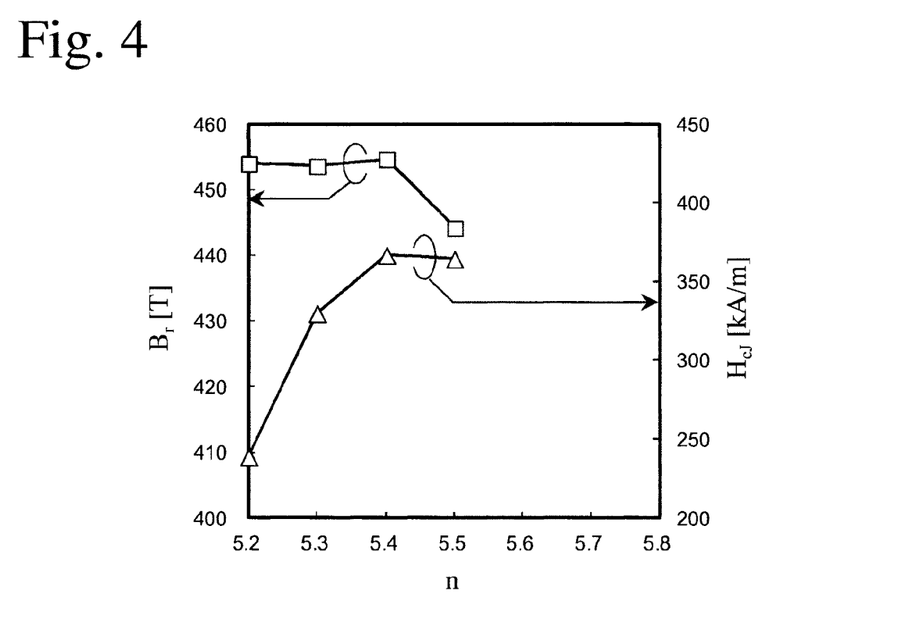
FIG. 4 is a graph showing the relation between a molar ratio n and $B_r$ and $H_{cJ}$ in calcined bodies for the sintered ferrite magnets of Samples 7-10 in Example 1.
Figure 5:
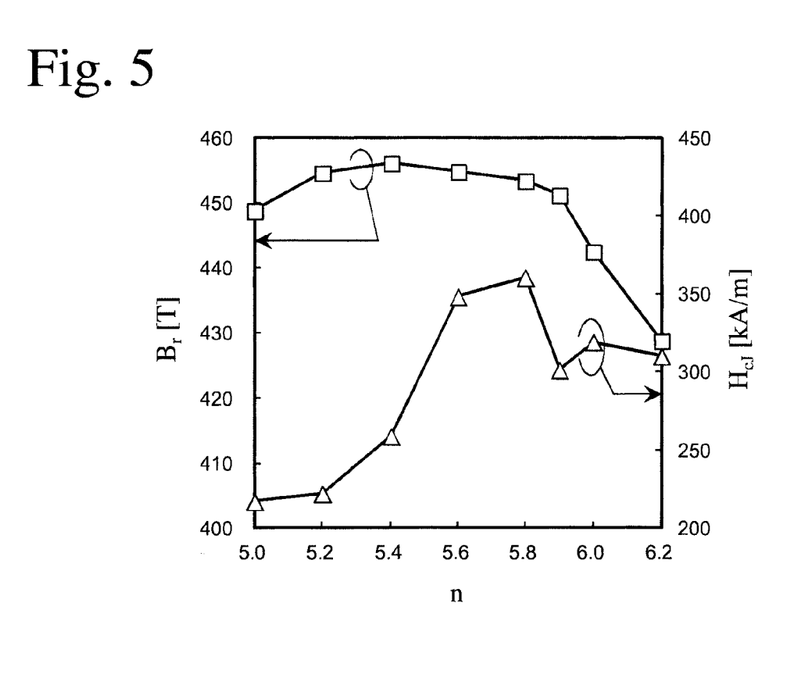
FIG. 5 is a graph showing the relation between a molar ratio n and $B_r$ and $H_{cJ}$ in calcined bodies for the sintered ferrite magnets of Samples 11-18 in Example 1.

FIGS. 3, 4 and 5 show the relation between a molar ratio n and $B_r$ and $H_{cJ}$ in calcined bodies for the sintered ferrite magnets of Samples 1-6, 7-10 and 11-18. In each figure, square points indicate $B_r$, and triangular points indicate $H_{cJ}$. In a ternary diagram of x, y, and 1−x−y expressing the composition of each calcined body, Samples 1-6 (FIG. 3) are (x, y, 1−x−y)=(0.385, 0.340, 0.275) in the region I, and Samples 7-10 (FIG. 4) are (x, y, 1−x−y)=(0.385, 0.240, 0.375) similarly in the region I, but Samples 11-18 are (x, y, 1−x−y)=(0.390, 0.410, 0.200) outside the region I.

Figure 6:
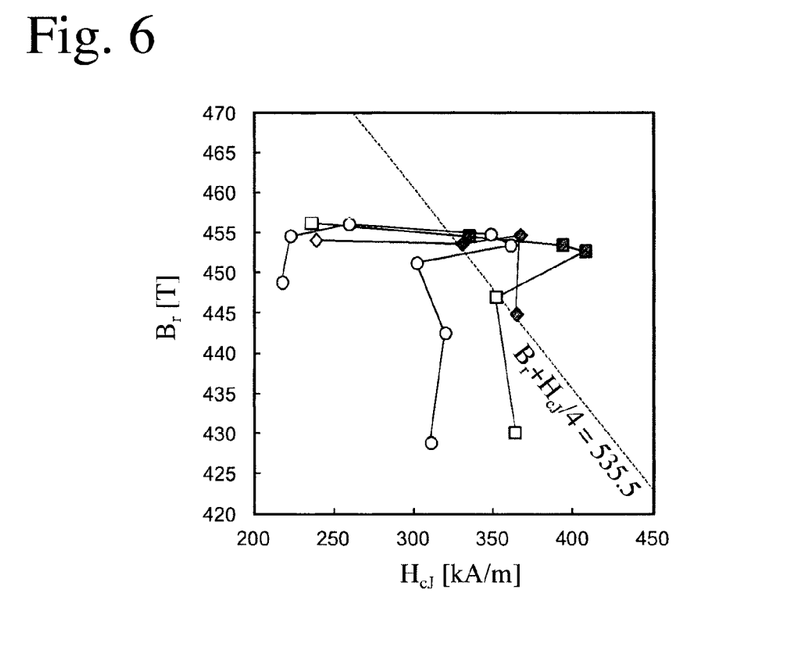
FIG. 6 is a graph showing the relation between $H_{cJ}$ and $B_r$ in sintered ferrite magnets in Example 1.

FIG. 6 shows the relation between $H_{cJ}$ and $B_r$ in Samples 1-18, with a dotted line of $B_r+H_{cJ}/4=535.5$. $B_r+H_{cJ}/4$ is 535.5 or more in an region on the upper right side from the line, and 535.5 or less in a lower left region. Square points indicate Samples 1-6 [(x, y, 1−x−y)=(0.385, 0.340, 0.275)], diamond points indicate Samples 7-10 [(x, y, 1−x−y)=(0.385, 0.240, 0.375)], and circular points indicate Samples 11-18 [(x, y, 1−x−y)=(0.390, 0.410, 0.200)]. The sintered ferrite magnets of the present invention (Samples 2-4 and 8-10) are indicated by black points.

As shown in Table 1 and FIG. 3, at (x, y, 1−x−y)=(0.385, 0.340, 0.275) in the region I shown in FIG. 1, 5.2<n<5.6 provides a sintered ferrite magnet with high $B_r$ and high $H_{cJ}$, but 5.2 or less of n provides low $H_{cJ}$, and 5.6 or more of n provides lowered $B_r$. Also, as shown in Table 1 and FIG. 4, at (x, y, 1−x−y)=(0.385, 0.240, 0.375) in the region I shown in FIG. 1, 5.3≤n≤5.5 provides a sintered ferrite magnet with high $B_r$ and high $H_{cJ}$. By these results, the molar ratio n is limited to 5.2<n<5.6 in the calcined body of the present invention. On the other hand, as shown in Table 1 and FIG. 5, at (x, y, 1−x−y)=(0.390, 0.410, 0.200) outside the region I shown in FIG. 1, the maximum $H_{cJ}$ tends to be low, and the value of n providing the maximum $H_{cJ}$ and drastically reducing $B_r$ tends to be large (n≥5.6).

Because a typical composition in Examples of WO 2008/105449 is (x, y, 1−x−y)=(0.390, 0.410, 0.200), the molar ratio n providing the maximum $H_{cJ}$ is in a range of n≥5.6. This result agrees with those shown in Tables 5 and 7 in WO 2008/105449 A. Samples 51-58 in Table 5 in WO 2008/105449 A are based on the composition of Sample 13 with the value of 12z (corresponding to "2n" in the present invention) changed, and as shown in Table 7 in WO 2008/105449 A, the maximum $H_{cJ}$ is obtained in Sample 13, namely at 12z=12.00 (n=6), and the maximum $B_r$ is obtained in Sample 54, namely at 12z=11.8 (n=5.9). Though higher $B_r$ and $H_{cJ}$ are obtained in Examples of WO 2008/105449 A than in this Example, their values of $B_r$ and $H_{cJ}$ cannot simply be compared, because production conditions, etc. are different between this Example and Examples of WO 2008/105449 A.

As shown in Table 1 and FIG. 6, all sintered ferrite magnets (black points) formed from the calcined bodies of the present invention, in which 1−x−y, x and y are in the region I shown in FIG. 1, and 5.2<n<5.6, meet the condition that $B_r+H_{cJ}/4$ is 535.5 or more, indicating excellent magnetic properties with high $B_r$ and high $H_{cJ}$. Among Samples 11-18, which are Comparative Examples based on the composition described in Example of WO 2008/105449 A, Samples 14 and 15 meet the condition that $B_r+H_{cJ}/4$ is 535.5 or more. However, the Co content (z) is 0.3 in any of Samples 11-18, more than in Examples of the present invention [Co content (z)=0.24]. This makes sintered ferrite magnets more expensive, despite as high magnetic properties as in Examples of the present invention. Thus, using the calcined bodies of the present invention, sintered ferrite magnets having excellent magnetic properties with high $B_r$ and high $H_{cJ}$ can be obtained inexpensively.

As described above, the calcined bodies of the present invention, in which 1−x−y, x and y are in the region I shown in FIG. 1, and 5.2<n<5.6, provide sintered ferrite magnets having high $B_r$ and high $H_{cJ}$. On the other hand, sintered ferrite magnets having high magnetic properties are obtained at n≥5.6 in WO 2008/105449 A, different from the present invention.

Example 2

Sintered magnets were produced in the same manner as in Example 1, except that raw material powders were mixed to the metal element composition formula (by atomic ratio) of $Ca_{1-x-y}La_x(Sr_{y'}Ba_{1-y'})_yFe_{2n-z}Co_z$ shown in Table 2. The compositions of the calcined bodies of Samples 3, 9 and 19-37 and the composition range of the calcined body in the present invention are shown in a ternary diagram of FIG. 7. The measurement results of $B_r$ and $H_{cJ}$ of the resultant sintered magnets are shown in Table 2 and FIG. 8. In Table 2, Samples with * are Comparative Examples.

TABLE 2

| Sample | 1−x−y | x | y | y' | yy' | y(1−y') | z | n |
|---|---|---|---|---|---|---|---|---|
| 19* | 0.425 | 0.385 | 0.190 | 1.000 | 0.190 | 0 | 0.24 | 5.4 |
| 9 | 0.375 | 0.385 | 0.240 | 1.000 | 0.240 | 0 | 0.24 | 5.4 |
| 20 | 0.325 | 0.385 | 0.290 | 1.000 | 0.290 | 0 | 0.24 | 5.4 |
| 3 | 0.275 | 0.385 | 0.340 | 1.000 | 0.340 | 0 | 0.24 | 5.4 |
| 21* | 0.225 | 0.385 | 0.390 | 1.000 | 0.390 | 0 | 0.24 | 5.4 |
| 22* | 0.175 | 0.385 | 0.440 | 1.000 | 0.440 | 0 | 0.24 | 5.4 |
| 23* | 0.375 | 0.285 | 0.340 | 1.000 | 0.340 | 0 | 0.24 | 5.4 |
| 24 | 0.325 | 0.335 | 0.340 | 1.000 | 0.340 | 0 | 0.24 | 5.4 |
| 25* | 0.225 | 0.435 | 0.340 | 1.000 | 0.340 | 0 | 0.24 | 5.4 |
| 26* | 0.175 | 0.485 | 0.340 | 1.000 | 0.340 | 0 | 0.24 | 5.4 |
| 27* | 0.275 | 0.285 | 0.440 | 1.000 | 0.440 | 0 | 0.24 | 5.4 |
| 28* | 0.275 | 0.335 | 0.390 | 1.000 | 0.390 | 0 | 0.24 | 5.4 |
| 29 | 0.275 | 0.435 | 0.290 | 1.000 | 0.290 | 0 | 0.24 | 5.4 |
| 30* | 0.275 | 0.485 | 0.240 | 1.000 | 0.240 | 0 | 0.24 | 5.4 |
| 31 | 0.375 | 0.335 | 0.290 | 1.000 | 0.290 | 0 | 0.24 | 5.4 |
| 32* | 0.425 | 0.335 | 0.240 | 1.000 | 0.240 | 0 | 0.24 | 5.4 |
| 33 | 0.275 | 0.42 | 0.305 | 1.000 | 0.305 | 0 | 0.24 | 5.4 |
| 34 | 0.325 | 0.42 | 0.255 | 1.000 | 0.255 | 0 | 0.24 | 5.4 |
| 35 | 0.375 | 0.42 | 0.205 | 1.000 | 0.205 | 0 | 0.24 | 5.4 |
| 36 | 0.275 | 0.45 | 0.275 | 1.000 | 0.275 | 0 | 0.24 | 5.4 |
| 37 | 0.325 | 0.45 | 0.225 | 1.000 | 0.225 | 0 | 0.24 | 5.4 |

| Sample | $B_r$ (mT) | $H_{cJ}$ (kA/m) | $B_r + H_{cJ}/4$ |
|---|---|---|---|
| 19* | 454.3 | 319.0 | 534.1 |
| 9 | 454.7 | 366.9 | 546.4 |

TABLE 2-continued

| | | | |
|---|---|---|---|
| 20 | 454.0 | 384.8 | 550.2 |
| 3 | 453.5 | 393.3 | 551.8 |
| 21* | 450.6 | 337.0 | 534.9 |
| 22* | 450.0 | 313.3 | 528.3 |
| 23* | 446.4 | 255.0 | 510.2 |
| 24 | 451.0 | 380.4 | 546.1 |
| 25* | 448.8 | 328.7 | 531.0 |
| 26* | 449.3 | 308.1 | 526.3 |
| 27* | 449.4 | 243.4 | 510.3 |
| 28* | 448.7 | 309.9 | 526.2 |
| 29 | 453.3 | 341.0 | 538.6 |
| 30* | 450.8 | 330.9 | 533.5 |
| 31 | 453.4 | 333.0 | 536.7 |
| 32* | 453.1 | 288.8 | 525.3 |
| 33 | 451.2 | 361.2 | 541.5 |
| 34 | 452.5 | 374.9 | 546.2 |
| 35 | 451.8 | 384.6 | 548.0 |
| 36 | 452.0 | 344.8 | 538.2 |
| 37 | 452.0 | 357.6 | 541.4 |

Note:
*indicates Comparative Example.

Figure 7:
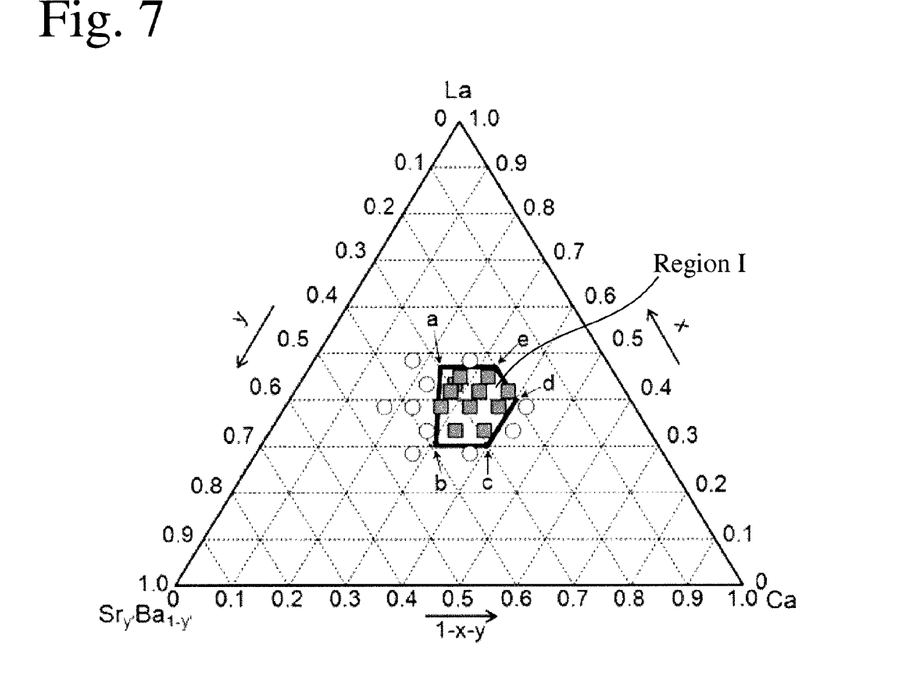
FIG. 7 is a ternary diagram showing the compositions of calcined bodies of Samples in Example 2 and the composition range of the calcined body of the present invention.

FIG. 7 shows a region I of 1−x−y, x and y in the calcined body of the present invention, which is defined by a coordinate a: (0.470, 0.297, 0.233), a coordinate b: (0.300, 0.392, 0.308), a coordinate c: (0.300, 0.300, 0.400), a coordinate d: (0.400, 0.200, 0.400) and a coordinate e: (0.470, 0.200, 0.330); and circular and square points of 1−x−y, x and y of Samples 3, 9 and 19-37, in a ternary diagram of x, y, and 1−x−y. The compositions of the calcined ferrites of the present invention are shown by black square points, and those of Comparative Examples are shown by circular points.

Figure 8:
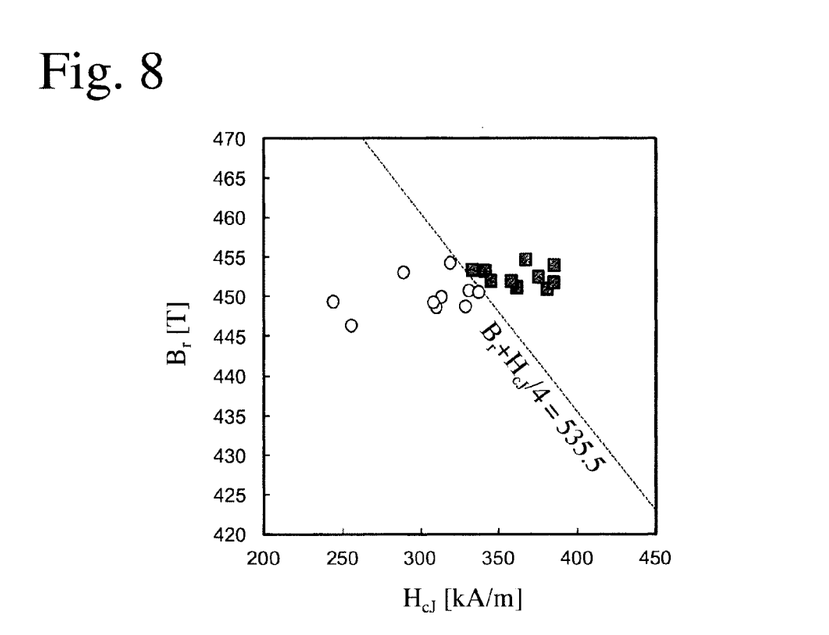
FIG. 8 is a graph showing the relation between $H_{cJ}$ and $B_r$ in sintered ferrite magnets in Example 2.

FIG. 8 shows the relation between $H_{cJ}$ and $B_r$ in Samples 3, 9 and 19-37, with a dotted line of $B_r+H_{cJ}/4=535.5$. $B_r+H_{cJ}/4$ is 535.5 or more in a region on the upper right side of this line, and 535.5 or less on the lower left side. In the figure, black square points indicate the sintered ferrite magnets of the present invention, and circular points indicate the sintered ferrite magnets of Comparative Examples.

It is clear from Table 2 and FIGS. 7 and 8 that using calcined bodies, in which 1−x−y, x and y were in the region I defined by a coordinate a: (0.470, 0.297, 0.233), a coordinate b: (0.300, 0.392, 0.308), a coordinate c: (0.300, 0.300, 0.400), a coordinate d: (0.400, 0.200, 0.400) and a coordinate e: (0.470, 0.200, 0.330) in the ternary diagram of FIG. 7, and y', z and n met the requirements of the present invention, sintered ferrite magnets (shown by black square points in the figure) having excellent magnetic properties with high $B_r$ and high $H_{cJ}$ were obtained. All sintered ferrite magnets met $B_r+H_{cJ}/4$ of 535.5 or more.

Example 3

Sintered magnets were produced in the same manner as in Example 1, except that raw material powders were mixed to the metal element composition formula (by atomic ratio) of $Ca_{1-x-y}La_x(Sr_yBa_{1-y'})_yFe_{2n-z}Co_z$ shown in Table 3. The measurement results of $B_r$ and $H_{cJ}$ of the sintered magnets are shown in Table 3 and FIGS. 9 and 10. In Table 3, Samples with * are Comparative Examples.

TABLE 3

| Sample | 1−x−y | x | y | y' | yy' | y(1−y') | z | n |
|---|---|---|---|---|---|---|---|---|
| 3 | 0.275 | 0.385 | 0.340 | 1.000 | 0.340 | 0 | 0.24 | 5.4 |
| 38 | 0.275 | 0.385 | 0.340 | 0.882 | 0.300 | 0.040 | 0.24 | 5.4 |
| 39 | 0.275 | 0.385 | 0.340 | 0.735 | 0.250 | 0.090 | 0.24 | 5.4 |
| 40 | 0.275 | 0.385 | 0.340 | 0.588 | 0.200 | 0.140 | 0.24 | 5.4 |
| 41* | 0.275 | 0.385 | 0.340 | 0.412 | 0.140 | 0.200 | 0.24 | 5.4 |
| 42* | 0.275 | 0.385 | 0.340 | 0.265 | 0.090 | 0.250 | 0.24 | 5.4 |
| 43* | 0.275 | 0.385 | 0.340 | 0.118 | 0.040 | 0.300 | 0.24 | 5.4 |
| 44* | 0.275 | 0.385 | 0.340 | 0 | 0 | 0.340 | 0.24 | 5.4 |

| Sample | $B_r$ (mT) | $H_{cJ}$ (kA/m) | $B_r+H_{cJ}/4$ |
|---|---|---|---|
| 3 | 453.5 | 393.3 | 551.8 |
| 38 | 451.8 | 371.0 | 544.5 |
| 39 | 448.1 | 366.6 | 539.8 |
| 40 | 449.0 | 350.3 | 536.6 |
| 41* | 450.2 | 335.7 | 534.1 |
| 42* | 449.7 | 324.1 | 530.7 |
| 43* | 448.2 | 320.1 | 528.2 |
| 44* | 446.2 | 312.5 | 524.3 |

Note:
*indicates Comparative Example.

Figure 9:
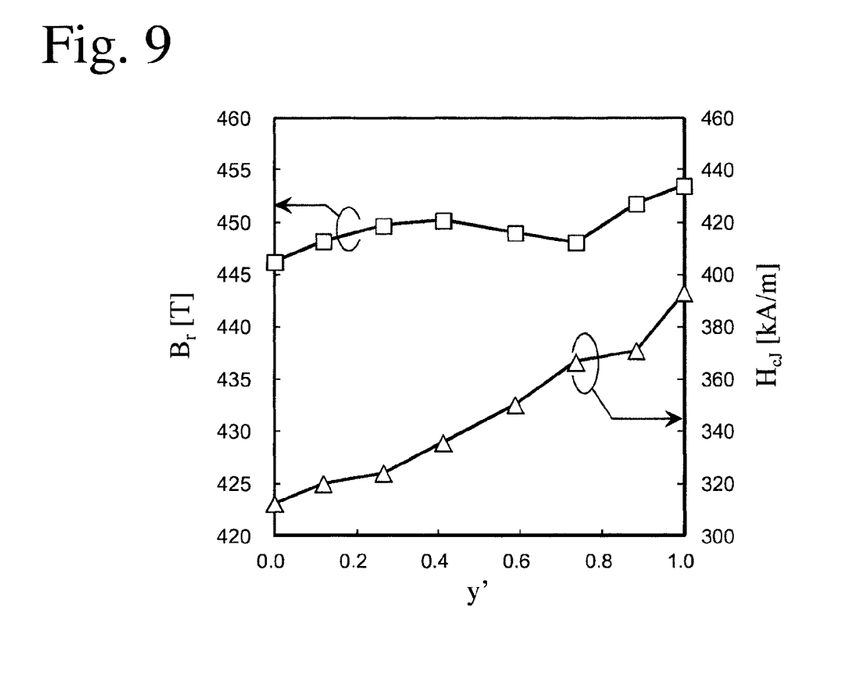
FIG. 9 is a graph showing the relation between y' and $B_r$ and $H_{cJ}$ in calcined bodies for sintered ferrite magnets in Example 3.
Figure 10:
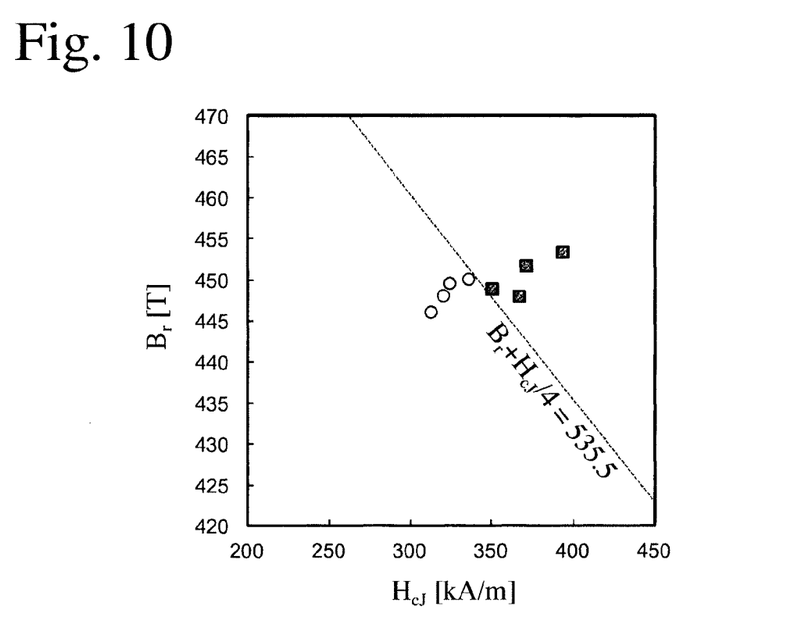
FIG. 10 is a graph showing the relation between $H_{cJ}$ and $B_r$ in sintered ferrite magnets in Example 3.

FIG. 9 shows the relation between y' and $B_r$ and $H_{cJ}$ in calcined bodies for the sintered ferrite magnets of Samples 3 and 38-44. These samples of the calcined bodies had a composition (x, y, 1−x−y)=(0.385, 0.340, 0.275), which was in the region I in the ternary diagram of x, y, and 1−x−y shown in FIG. 1. In the figure, square points represent $B_r$, and triangular points represent $H_{cJ}$. FIG. 10 shows the relation between $H_{cJ}$ and $B_r$ in the sintered ferrite magnets of Samples 3 and 38-44, with a dotted line of $B_r+H_{cJ}/4=535.5$. $B_r+H_{cJ}/4$ was 535.5 or more in a region on the upper right side of this line, and 535.5 or less in a region on the lower left side. The sintered ferrite magnets of the present invention are indicated by black square points, and the sintered ferrite magnets of Comparative Examples are indicated by circular points.

As shown in Table 3 and FIG. 9, though 0.412 or less of y' in the calcined body provides low $H_{cJ}$, 0.5≤y'≤1 provides a sintered ferrite magnet with high $B_r$ and high $H_{cJ}$. By these results, y' is limited to 0.5≤y'≤1 in the calcined body. It is clear from FIG. 10 that all the sintered ferrite magnets of the present invention with 0.5≤y'≤1 (shown by black square points in the figure) meet $B_r+H_{cJ}/4=535.5$ or more, providing excellent magnetic properties with high $B_r$ and high $H_{cJ}$.

Example 4

$CaCO_3$ powder, $La(OH)_3$ powder, $SrCO_3$ powder, $BaCO_3$ powder, $Fe_2O_3$ powder and $Co_3O_4$ powder were mixed to the ratios shown in Table 4 (the values of z are shown in the column of "When Mixed") in the metal element composition formula (by atomic ratio) of $Ca_{1-x-y}La_x(Sr_yBa_{1-y'})_yFe_{2n-z}Co_z$, and 100% by mass of the mixed powders were mixed with 0.1% by mass of $H_3BO_3$ powder to obtain a raw material powder mixture. The molar ratio n was 5.4 (when mixed) in Samples 3 and 45-49 (prior-addition method), and 5.4 (when $Co_3O_4$ powder was added during fine pulverization, namely in a mixture of the calcined body and $Co_3O_4$ powder without a sintering aid) in Samples 50-54 (post-addition method). Incidentally, n was 5.38 (when mixed) in Sample 50, 5.355 (when mixed) in Sample 51, 5.33 (when mixed) in Sample 52, 5.305 (when mixed) in Sample 53, and 5.28 (when mixed) in Sample 54. Each raw material powder mixture was wet-ball-milled for 4 hours, dried, granulated, and then calcined at 1250° C. for 3 hours in the air. Each resultant calcined body was coarsely pulverized by a hammer mill to obtain coarse powder.

100% by mass of each coarse powder was mixed with 0.7% by mass (as CaO) of $CaCO_3$ powder and 0.6% by mass of $SiO_2$ powder, as well as $Co_3O_4$ powder in such an amount as having z shown in the column of "When Finely Pulverized" in Table 4, wet-ball-milled with water as a dispersion medium, and then finely pulverized to an average particle size of 0.6 μm (measured by an air permeation method). The finely pulverized powder slurry was molded under pressure of about 50 MPa in a magnetic field of about 1.3 T in parallel with a compression direction, while removing the dispersion medium. The resultant green body was sintered at about 1200° C. for 1 hour in the air, to obtain sintered magnets.

Figure 11:
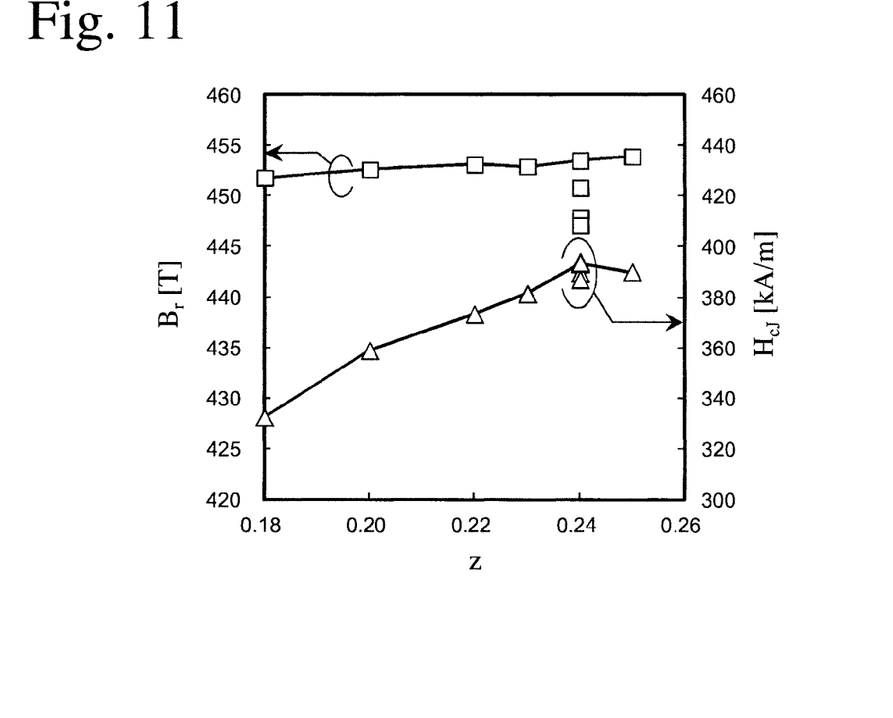
FIG. 11 is a graph showing the relation between z and $B_r$ and $H_{cJ}$ in calcined bodies for sintered ferrite magnets in Example 4.
Figure 12:
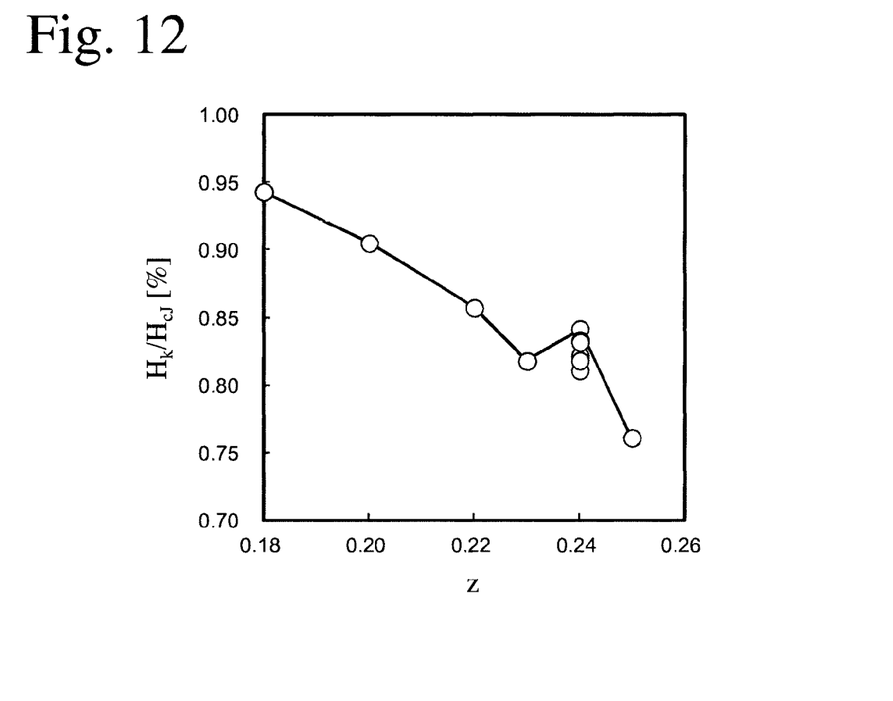
FIG. 12 is a graph showing the relation between z and $H_k/H_{cJ}$ in calcined bodies for sintered ferrite magnets in Example 4.
Figure 13:
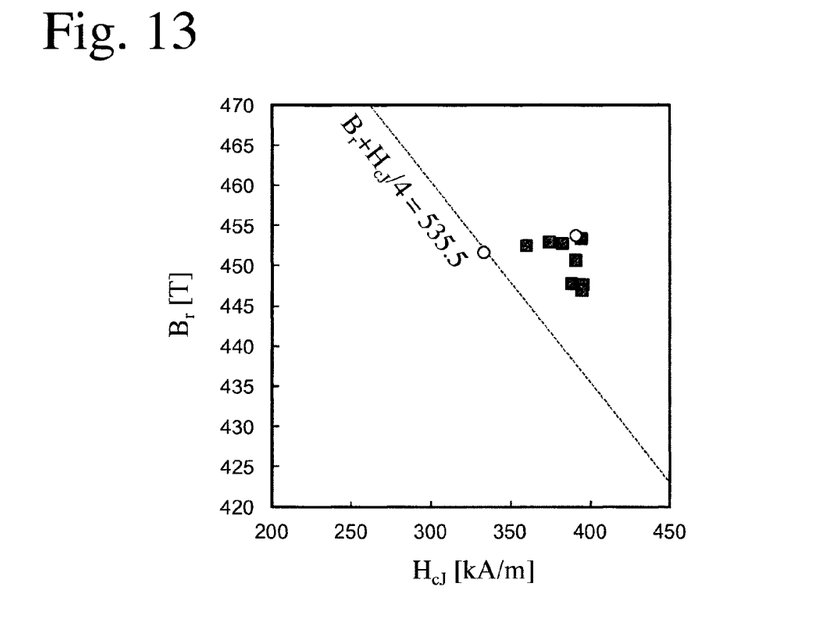
FIG. 13 is a graph showing the relation between $H_{cJ}$ and $B_r$ in sintered ferrite magnets in Example 4.

The measurement results of $B_r$, $H_{cJ}$ and $H_k \cdot H_{cJ}^{-1}$ ($H_k/H_{cJ}$) of the sintered magnets are shown in Table 4 and FIGS. 11-13. In Table 4, Samples with * are Comparative Examples. FIG. 11 shows the relation between z and $B_r$ and $H_{cJ}$, with square points representing $B_r$, and triangular points representing $H_{cJ}$. FIG. 12 shows the relation between z and $H_k/H_{cJ}$. In $H_k/H_{cJ}$, $H_k$ represents the value of H at a position in the second quadrant at which J is 0.95 $B_r$ in a curve of J (intensity of magnetization) to H (intensity of magnetic field).

figure) obtained from the calcined bodies with 0.2≤z<0.25 had excellent magnetic properties with high $B_r$ and high $H_{cJ}$, meeting $B_r+H_{cJ}/4=535.5$ or more. Further, high $B_r$ and high $H_{cJ}$ were obtained by any of the prior-addition method in which all of Co was added during mixing, and the post-addition method in which part or none of Co was added during mixing and then remaining part or all of Co was added during fine pulverization.

Example 5

$CaCO_3$ powder, $La(OH)_3$ powder, $SrCO_3$ powder, $BaCO_3$ powder, $Fe_2O_3$ powder and $Co_3O_4$ powder were mixed to a metal element composition of $Ca_{0.275}La_{0.385}Sr_{0.340}Fe_{10.56}Co_{0.24}$ (by atomic ratio), and 100% by mass of the mixed powders were then mixed with 0.1% by mass of $H_3BO_3$ powder to prepare a raw material powder mixture. The raw material powder mixture was wet-ball-milled for 4 hours, dried, granulated, and then

TABLE 4

| Sample | 1-x-y | x | y | y' | yy' | y(1-y') | z When Mixed | z When Finely Pulverized |
|---|---|---|---|---|---|---|---|---|
| 45* | 0.275 | 0.385 | 0.340 | 1.000 | 0.340 | 0 | 0.18 | 0 |
| 46 | 0.275 | 0.385 | 0.340 | 1.000 | 0.340 | 0 | 0.2 | 0 |
| 47 | 0.275 | 0.385 | 0.340 | 1.000 | 0.340 | 0 | 0.22 | 0 |
| 48 | 0.275 | 0.385 | 0.340 | 1.000 | 0.340 | 0 | 0.23 | 0 |
| 3 | 0.275 | 0.385 | 0.340 | 1.000 | 0.340 | 0 | 0.24 | 0 |
| 49* | 0.275 | 0.385 | 0.340 | 1.000 | 0.340 | 0 | 0.25 | 0 |
| 50 | 0.275 | 0.385 | 0.340 | 1.000 | 0.340 | 0 | 0.2 | 0.04 |
| 51 | 0.275 | 0.385 | 0.340 | 1.000 | 0.340 | 0 | 0.15 | 0.09 |
| 52 | 0.275 | 0.385 | 0.340 | 1.000 | 0.340 | 0 | 0.1 | 0.14 |
| 53 | 0.275 | 0.385 | 0.340 | 1.000 | 0.340 | 0 | 0.05 | 0.19 |
| 54 | 0.275 | 0.385 | 0.340 | 1.000 | 0.340 | 0 | 0 | 0.24 |

| Sample | $B_r$ (mT) | $H_{cJ}$ (kA/m) | $H_k/H_{cJ}$ | $B_r + H_{cJ}/4$ |
|---|---|---|---|---|
| 45* | 451.8 | 332.5 | 0.943 | 534.9 |
| 46 | 452.6 | 358.9 | 0.905 | 542.3 |
| 47 | 453.1 | 373.4 | 0.857 | 546.4 |
| 48 | 452.9 | 381.5 | 0.818 | 548.3 |
| 3 | 453.5 | 393.3 | 0.842 | 551.8 |
| 49* | 453.9 | 390.0 | 0.761 | 551.4 |
| 50 | 450.8 | 389.6 | 0.834 | 548.2 |
| 51 | 447.8 | 394.2 | 0.822 | 546.3 |
| 52 | 447.9 | 387.1 | 0.811 | 544.7 |
| 53 | 447.8 | 393.8 | 0.832 | 546.2 |
| 54 | 447.1 | 393.6 | 0.818 | 545.5 |

Note:
*indicates Comparative Example.

FIG. 13 shows the relation between $H_{cJ}$ and $B_r$ in Samples 3 and 45-54, with a dotted line of $B_r+H_{cJ}/4=535.5$. $B_r+H_{cJ}/4$ was 535.5 or more in a region on the upper right side of the line, and 535.5 or less in a region on the lower left side. The sintered ferrite magnets of the present invention are indicated by black square points, and the sintered ferrite magnets of Comparative Examples are indicated by circular points.

As shown in Table 4 and FIG. 11, a calcined body meeting 0.2≤z<0.25 provides a sintered ferrite magnet with high $B_r$ and high $H_{cJ}$. As shown in Table 4 and FIG. 12, Sample 49 (z=0.25) of Comparative Example has so drastically reduced $H_k/H_{cJ}$ that it cannot provide recently demanded thin sintered ferrite magnets, despite high $B_r$ and high $H_{cJ}$. By these results, z in the calcined body is limited to 0.2≤z<0.25.

As shown in FIG. 13, all the sintered ferrite magnets of the present invention (shown by black square points in the calcined at 1250° C. for 3 hours in the air. The calcined body was coarsely pulverized by a hammer mill to obtain a coarse powder.

$CaCO_3$ powder and $SiO_2$ powder in amounts shown in Table 5 were added to 100% by mass of the coarse powder. The amount of $CaCO_3$ powder added is expressed by the amount of CaO. Next, fine pulverization was conducted by a wet ball mill with water as a dispersion medium, to an average particle size of 0.6 μm (measured by an air permeation method). The finely pulverized powder slurry was molded under pressure of about 50 MPa in a magnetic field of about 1.3 T in parallel with a compression direction, while removing the dispersion medium. The resultant green body was sintered at about 1200° C. for 1 hour in the air, to obtain a sintered magnet.

Figure 14:
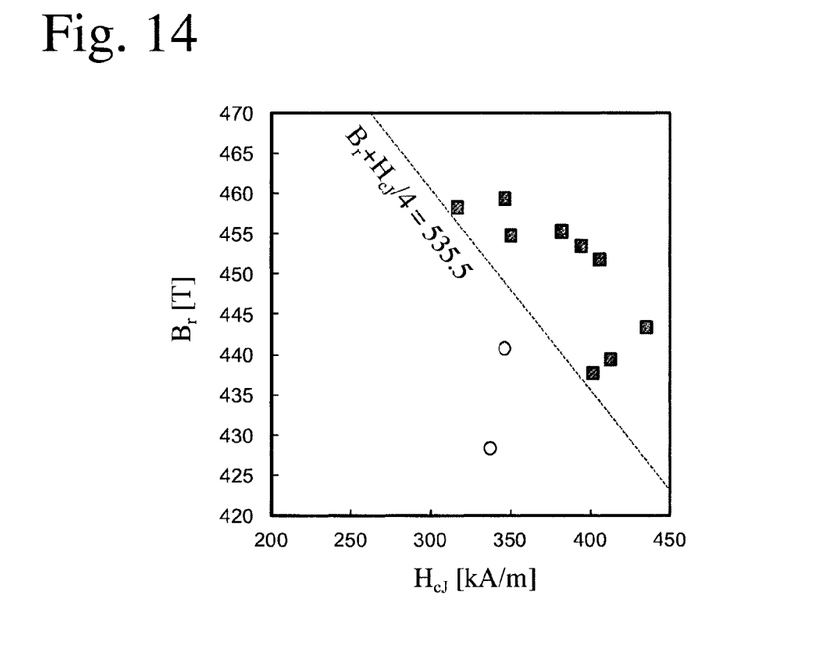
FIG. 14 is a graph showing the relation between $H_{cJ}$ and $B_r$ in sintered ferrite magnets in Example 5.

The measurement results of $B_r$ and $H_{cJ}$ of the sintered magnet are shown in Table 5 and FIG. 14. In Table 5, Samples with * are Comparative Examples. FIG. 14 shows the relation between $H_{cJ}$ and $B_r$ in Samples 3 and 55-64, with a dotted line of $B_r + H_{cJ}/4 = 535.5$. $B_r + H_{cJ}/4$ is 535.5 or more in a region on the upper right side of the line, and 535.5 or less in a region on the lower left side. Black square points indicate the sintered ferrite magnets of the present invention, and circular points indicate the sintered ferrite magnets of Comparative Examples.

TABLE 5

| Sample | CaO (% by mass) | SiO$_2$ (% by mass) | $B_r$ (mT) | $H_{cJ}$ (kA/m) | $B_r + H_{cJ}/4$ |
|---|---|---|---|---|---|
| 55 | 0 | 0.2 | 459.4 | 324.6 | 540.6 |
| 56 | 0.1 | 0.2 | 458.3 | 316.0 | 537.3 |
| 57 | 0.2 | 0.3 | 454.8 | 349.5 | 542.2 |
| 58 | 0.3 | 0.4 | 455.3 | 381.1 | 550.6 |
| 59 | 0.5 | 0.5 | 451.8 | 404.7 | 553.0 |
| 3 | 0.7 | 0.6 | 453.5 | 393.3 | 551.8 |
| 60 | 1.1 | 0.8 | 443.4 | 434.1 | 551.9 |
| 61 | 1.5 | 1.2 | 437.7 | 400.5 | 537.8 |
| 62 | 1.8 | 1.2 | 439.4 | 411.5 | 542.3 |
| 63* | 2.1 | 1.2 | 440.8 | 345.6 | 527.2 |
| 64* | 1.5 | 1.5 | 428.4 | 336.7 | 512.6 |

Note:
*indicates Comparative Example.

As shown in Table 5 and FIG. 14, high $B_r$ and $H_{cJ}$ were obtained in wide ranges of CaCO$_3$ (as CaO) and SiO$_2$, providing sintered ferrite magnets having excellent magnetic properties with $B_r + H_{cJ}/4 = 535.5$ or more. However, 2.1% or more by mass (as CaO) of CaCO$_3$ and 1.5% or more by mass of SiO$_2$ lower $B_r$ and $H_{cJ}$, failing to provide recently demanded thin sintered ferrite magnets.

Example 6

The sintered ferrite magnets of Sample 3 in Example 1, Samples 31 and 32 in Example 2, and Samples 55, 61 and 63 in Example 5 were subjected to component analysis by an ICP atomic emission spectrometer (ICPV-1017 available from Shimadzu Corporation), to determine the atomic ratios of metal elements and the molar ratios n. The results are shown in Table 6. In the atomic ratios of metal elements and the molar ratios n determined from component analysis, the amount of SiO$_2$ is expressed by a ratio (% by mass) to 100% by mass of the total amount of CaCo$_3$, La(OH)$_3$, SrCO$_3$, Fe$_2$O$_3$, and Co$_3$O$_4$.

TABLE 6

| Sample | 1 − x − y | x | y | y' | yy' |
|---|---|---|---|---|---|
| 3 | 0.352 | 0.349 | 0.299 | 0.990 | 0.296 |
| 31 | 0.441 | 0.301 | 0.258 | 0.988 | 0.255 |
| 33* | 0.484 | 0.301 | 0.214 | 0.991 | 0.212 |
| 55 | 0.280 | 0.383 | 0.337 | 0.988 | 0.333 |
| 61 | 0.417 | 0.310 | 0.273 | 0.989 | 0.270 |
| 63* | 0.457 | 0.290 | 0.253 | 0.988 | 0.250 |

| Sample | y(1 − y') | z | n | SiO$_2$ (% by mass) |
|---|---|---|---|---|
| 3 | 0.003 | 0.215 | 5.06 | 0.57 |
| 32 | 0.003 | 0.213 | 4.96 | 0.57 |
| 33* | 0.002 | 0.212 | 4.98 | 0.57 |
| 56 | 0.004 | 0.236 | 5.48 | 0.24 |

TABLE 6-continued

| 62 | 0.003 | 0.190 | 4.50 | 1.10 |
| 64* | 0.003 | 0.177 | 4.23 | 1.09 |

Note:
*indicates Comparative Example.

It is clear that in the sintered ferrite magnets of the present invention, the values of 1−x−y, x and y are in the region II shown in FIG. 2, and those of y' and z and n representing a molar ratio meet $0.5 \leq y' \leq 1$, $0.147 \leq z < 0.25$, and $3.88 \leq n < 5.6$.

Effect of the Invention

The use of the calcined ferrite of the present invention can provide a sintered ferrite magnet having high $B_r$ and high $H_{cJ}$. Because the Co content can be reduced than in conventional CaLaCo ferrites, sintered ferrite magnets having high $B_r$ and high $H_{cJ}$ can be obtained inexpensively.

Because the sintered ferrite magnet of the present invention has a high residual magnetic flux density $B_r$ (mT) and a high intrinsic coercivity $H_{cJ}$ (kA/m) at 23° C., meeting the relation of $B_r + H_{cJ}/4 \geq 535.5$, it can be made fully thin.

The sintered ferrite magnets of the present invention can provide parts for automobile electric parts, electric equipments, etc., such as various motors, electric generators, speakers, etc., which have high performance with reduced size and weight.

What is claimed is:

1. A calcined ferrite comprising metal elements of Ca, La, Sr, Ba, Fe and Co, whose atomic ratios are represented by the general formula:

$$Ca_{1-x-y}La_x(Sr_{y'}Ba_{1-y'})_yFe_{2n-z}Co_z,$$

wherein 1−x−y, x and y are values in a region defined by a coordinate a: (0.470, 0.297, 0.233), a coordinate b: (0.300, 0.392, 0.308), a coordinate c: (0.300, 0.300, 0.400), a coordinate d: (0.400, 0.200, 0.400) and a coordinate e: (0.470, 0.200, 0.330) in a ternary diagram of x, y, and 1−x−y; and y' and z, and n representing a molar ratio are values meeting
   $0.5 \leq y' \leq 1$,
   $0.2 \leq z < 0.25$, and
   $5.2 < n < 5.6$.

2. A method for producing a sintered ferrite magnet comprising the steps of
   mixing raw material powders to a composition comprising metal elements of Ca, La, Sr, Ba, Fe and Co, whose atomic ratios are represented by the general formula:

$$Ca_{1-x-y}La_x(Sr_{y'}Ba_{1-y'})_yFe_{2n-z}Co_z,$$

wherein 1−x−y, x and y are values in a region defined by a coordinate a: (0.470, 0.297, 0.233), a coordinate b: (0.300, 0.392, 0.308), a coordinate c: (0.300, 0.300, 0.400), a coordinate d: (0.400, 0.200, 0.400) and a coordinate e: (0.470, 0.200, 0.330) in a ternary diagram of x, y, and 1−x−y; and y' and z, and n representing a molar ratio are values meeting
   $0.5 \leq y' \leq 1$,
   $0.2 \leq z < 0.25$, and
   $5.2 < n < 5.6$,
thereby obtaining a raw material powder mixture;
   calcining said raw material powder mixture to obtain a calcined body;
   pulverizing said calcined body to obtain calcined powder;
   molding said calcined powder to obtain a green body; and
   sintering said green body to obtain a sintered body;

0.1% or more and less than 1.5% by mass of $SiO_2$ being added to 100% by mass of said raw material powder mixture, said calcined body or said calcined powder; and 0-2% by mass (as CaO) of $CaCO_3$ being added to 100% by mass of said calcined body or said calcined powder.

3. A method for producing a sintered ferrite magnet comprising the steps of mixing raw material powders to a composition comprising metal elements of Ca, La, Sr, Ba, Fe and Co, whose atomic ratios are represented by the general formula:

$$Ca_{1-x-y}La_x(Sr_{y'}Ba_{1-y'})_yFe_{2n-z}Co_z,$$

wherein $1-x-y$, x and y are values in a region defined by a coordinate a: (0.470, 0.297, 0.233), a coordinate b: (0.300, 0.392, 0.308), a coordinate c: (0.300, 0.300, 0.400), a coordinate d: (0.400, 0.200, 0.400) and a coordinate e: (0.470, 0.200, 0.330) in a ternary diagram of x, y, and $1-x-y$; and y' and z, and n representing a molar ratio are values meeting $0.5 \le y' \le 1$,
$0 \le z < 0.25$, and
$5.2 < n < 5.6$, thereby obtaining a raw material powder mixture;
calcining said raw material powder mixture to obtain a calcined body;
pulverizing said calcined body to obtain a calcined powder;
molding said calcined powder to obtain a green body; and
sintering said green body to obtain a sintered body;

a raw material powder of Co being added to said calcined body or said calcined powder, such that said z meets $0.2 \le z < 0.25$ as a whole;

0.1% or more and less than 1.5% by mass of $SiO_2$ being added to 100% by mass of said raw material powder mixture, said calcined body or said calcined powder; and 0-2% by mass (as CaO) of $CaCO_3$ being added to 100% by mass of said calcined body or said calcined powder.

4. A sintered ferrite magnet produced by the method recited in claim 2, which comprises metal elements of Ca, La, Sr, Ba, Fe and Co, whose atomic ratios are represented by the general formula:

$$Ca_{1-x-y}La_x(Sr_{y'}Ba_{1-y'})_yFe_{2n-z}Co_z,$$

wherein $1-x-y$, x and y are values in a region defined by a coordinate a: (0.470, 0.297, 0.233), a coordinate b: (0.300, 0.392, 0.308), a coordinate f: (0.221, 0.289, 0.490), a coordinate g: (0.221, 0.221, 0.558), a coordinate h: (0.295, 0.147, 0.558), a coordinate i: (0.346, 0.147, 0.507) and a coordinate e: (0.470, 0.200, 0.330) in a ternary diagram of x, y, and $1-x-y$; and y' and z, and n representing a molar ratio are values meeting $0.5 \le y' \le 1$,
$0.147 \le z < 0.25$, and
$3.88 \le n < 5.6$, said sintered ferrite magnet having a residual magnetic flux density $B_r$ (mT) and an intrinsic coercivity $H_{cJ}$ (kA/m) at 23° C. meeting the relation of $B_r + H_{cJ}/4 \ge 535.5$.

* * * * *